(12) United States Patent
Peterson et al.

(10) Patent No.: US 10,527,909 B2
(45) Date of Patent: Jan. 7, 2020

(54) LIGHTING SYSTEM FOR PHOTOGRAPHY STATION

(71) Applicant: Lifetouch Inc., Eden Prairie, MN (US)

(72) Inventors: Brent Peterson, Chanhassen, MN (US); Michael Surma, Eagan, MN (US)

(73) Assignee: Lifetouch Inc., Eden Prairie, MN (US)

( * ) Notice: Subject to any disclaimer, the term of this patent is extended or adjusted under 35 U.S.C. 154(b) by 0 days.

(21) Appl. No.: 15/657,092

(22) Filed: Jul. 21, 2017

(65) Prior Publication Data

US 2019/0025671 A1    Jan. 24, 2019

(51) Int. Cl.
*G03B 15/02* (2006.01)
*F21V 8/00* (2006.01)
*H05B 33/08* (2006.01)

(52) U.S. Cl.
CPC .......... *G03B 15/02* (2013.01); *G02B 6/0068* (2013.01); *G02B 6/0051* (2013.01); *G02B 6/0088* (2013.01); *H05B 33/0845* (2013.01)

(58) Field of Classification Search
CPC ......... G03B 15/03; G03B 15/05; G03B 15/07
See application file for complete search history.

(56) References Cited

U.S. PATENT DOCUMENTS

| | | | |
|---|---|---|---|
| 5,426,879 A | 6/1995 | Hecker | |
| 5,534,963 A | 7/1996 | Adolphi et al. | |
| 8,488,954 B2 | 7/2013 | Delzell | |
| 8,768,155 B2 | 7/2014 | Delzell | |
| 9,429,817 B1 | 8/2016 | Harder et al. | |
| 9,619,931 B1 | 4/2017 | Klabunde | |
| 2010/0296801 A1 | 11/2010 | Lane | |
| 2011/0317057 A1* | 12/2011 | Delzell | G03B 15/02 348/333.11 |
| 2014/0198527 A1* | 7/2014 | Stephens | F21S 8/08 362/612 |
| 2015/0227027 A1* | 8/2015 | Otsuka | G03B 15/05 348/371 |
| 2015/0330610 A1* | 11/2015 | Song | F21V 25/12 362/6 |
| 2015/0338722 A1* | 11/2015 | Bonnier | G03B 15/07 362/4 |
| 2016/0100087 A1 | 4/2016 | Scheich | |
| 2017/0146204 A1 | 5/2017 | Di Trapan et al. | |

FOREIGN PATENT DOCUMENTS

| | | |
|---|---|---|
| CN | 203658714 U | 6/2014 |
| CN | 204203605 U | 3/2015 |
| CN | 105259730 A | 1/2016 |
| DE | 102005039792 A1 | 3/2007 |
| KR | 2001086642 A | 9/2001 |
| WO | 2016049635 A1 | 3/2016 |

* cited by examiner

*Primary Examiner* — Noam Reisner
(74) *Attorney, Agent, or Firm* — Merchant & Gould P.C.

(57) ABSTRACT

A photography system includes a lighting system configured to provide a lighting scene that is diffused and is artistically desirable. The system includes an array of light panels configured to simulate a wall of windows that receive natural, diffused, and consistent sunlight, such as a large window facing the north. The light panels can operate in various modes of operation, such as a continuous light mode a strobe light mode.

14 Claims, 18 Drawing Sheets

US 10,527,909 B2

LIGHTING SYSTEM FOR PHOTOGRAPHY STATION

BACKGROUND

Portrait photographs are often taken in a portrait studio. Such a studio typically includes one or more lighting units that illuminate a subject, and a film or digital camera is used to capture the subject's image while the subject is posing in the studio. A variety of artificial lighting units can be used to create quality portraits with various lighting effects.

Flash light sources, such as xenon flashtubes, are typically used as photographic strobe lights. Such flash light sources themselves are highly directional and as a result generate a harsh light that can, for example, create undesired shadows highlighting any imperfections in the subject. As a result, flash light sources typically require various additional components, such as light modifiers, to create a desired light distribution on the subject and scene of the portrait. Some examples of such light modifiers include diffusion panels, soft boxes, reflectors, and reflective umbrellas. The combination of a flash light source with a light modifier is typically quite large, and has the drawback of taking up quite a large amount of space, particularly when used in a small photo studio.

Further, multiple light sources are typically used in a portrait studio to create various lighting scene designs. As the number of light sources increases, however, it is more complex for a photographer to arrange and control such multiple light sources together to create a desired lighting effect to a subject, and the combination of multiple light sources takes up even more space in the photo studio.

SUMMARY

In general terms, the present disclosure relates to a lighting system for a photography station. In one possible configuration and by non-limiting example, the lighting system includes a panel light device configured to generate a diffused light toward a subject arranged in a photography station. Various aspects are described in this disclosure, which include, but are not limited to, the following aspects.

One aspect is a photography system. The photography system includes a camera, a studio frame, and a panel light device. The camera is arranged and configured to capture an image of a subject. The studio frame includes a wall frame, and defines a subject arrangement area therein for arranging the subject during photography. The panel light device includes a plurality of light panels mounted to the wall frame. Each light panel is configured to generate diffused light toward the subject at the subject arrangement area.

Another aspect is a photography method comprising: setting up a photography station by: arranging a camera with respect to a subject arrangement area; arranging a light assembly with respect to the subject arrangement area, the light assembly configured to generate diffused light toward the subject at the subject arrangement area; and connecting a controller to the camera and the light assembly; operating the controller to control the light assembly in a continuous light mode, the light assembly generating a continuous light with a first light intensity in the continuous light mode; and operating the controller to switch the light assembly from the continuous light mode to a strobe light mode, the light assembly configured to generate a strobe light with a second light intensity, the second light intensity greater than the first light intensity.

Yet another aspect is a photography system including a camera, a subject arrangement area, a panel light device, and a controller. The camera is arranged and configured to capture an image of a subject. The subject arrangement area is configured for arranging the subject during photography. The panel light device includes a plurality of light panels and a plurality of power control units configured to control the plurality of light panels, respectively. The controller is configured to selectively operate at least one of the plurality of light panels in a continuous light mode through the plurality of power control units. The controller is further configured to switch at least one of the plurality of light panels from the continuous light mode to a strobe light mode.

DETAILED DESCRIPTION

Figure 1:
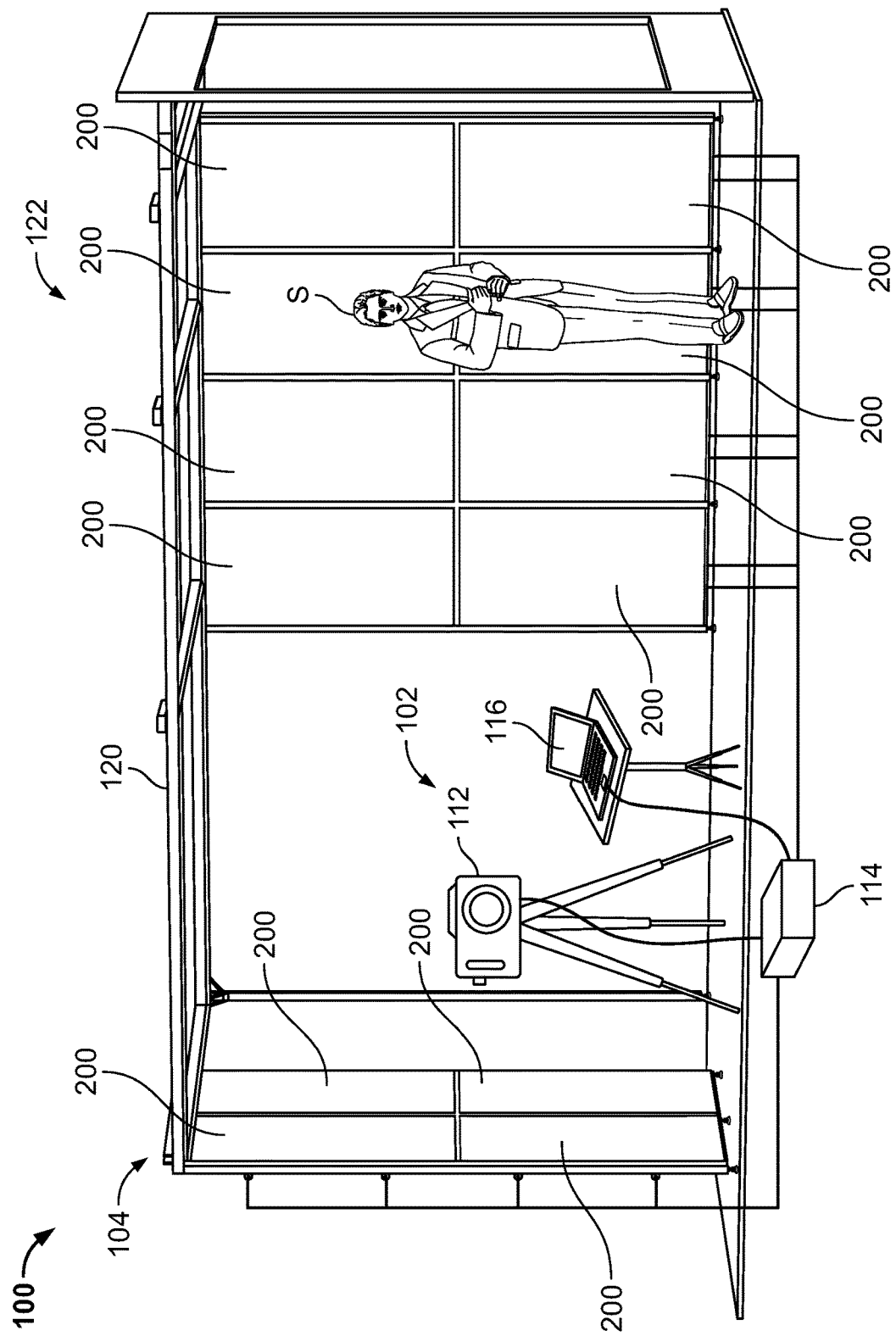
FIG. 1 is a schematic perspective diagram of an example photography station.

Various embodiments will be described in detail with reference to the drawings, wherein like reference numerals represent like parts and assemblies throughout the several views.

In general, a photography system of the present disclosure includes a lighting system configured to provide a lighting scene that mimics natural sunlight coming through a window, which is diffused and is artistically desirable. In certain embodiments, the system includes an array of light panels configured to simulate a wall of windows that receive natural, diffused, and consistent sunlight, such as a large window facing the north.

Such a natural window light effect provided by the light panels can help to reduce undesirable shadows on a subject and provide softening effect on the subject. The natural window light effect of the light panels can also be more forgiving in terms of light exposure, in contrast to a point source of light. For example, the natural window light effect can provide a good quality exposure in a large physical area.

Further, in at least some embodiments the system reduces space, cost, and energy required for light sources in a photography studio by removing typical flash light sources and light modifiers, such as reflectors, reflective umbrellas, and soft boxes, which require a larger space, are more expensive, and consume more energy.

Each of the light panels is configured to generate diffused light. The light panels are configured to provide a continuous light and selectively generate a strobe light. In some embodiments, the light panels can operate in different modes of operation. Example modes of operation include a continuous lighting mode and a strobe mode. Further, the light panels can be used in a video capture mode.

FIG. 1 is a schematic perspective diagram of an example photography station 100. In one example, the photography station 100, which is also referred to herein as a photography system or photography studio, includes an image capture system 102 and a station assembly 104. In some embodiments, the image capture system 102 includes a camera 112, a controller 114, and a computing device 116. In some embodiments, the station assembly 104 includes a station frame 120 and a light assembly 122.

The image capture system 102 operates to capture an image of one or more subjects in the photography studio, and, in some embodiments, to control the overall operation of the photography station 100. For example, in some embodiments, the image capture system 102 performs a setup process to ensure that the photography station 100 is properly set up, to capture digital images of a subject, and to monitor the operation of the photography station 100 while the images are being captured to alert the photographer to potential problems.

The camera 112 is typically a digital camera that operates to capture digital images of one or more subjects. In this document, a subject is referred to as a single subject or a group of subjects. An example of camera 112 is described and illustrated in more detail herein with reference to FIG. 7. The camera 112 can be handheld for photography. Alternatively, the camera 112 can be mounted on a tripod or other support structure.

The controller 114 operates to control and coordinate the operation of various components of the photography station 100. The controller 114 can operate to synchronize operations of the camera 112 and the light assembly 122. In some embodiments, the controller 114 is configured to be manually operated by a user (e.g., a photographer) with or without connection to the computing device 116. With this configuration, the controller 114 can provide a user interface, such as a button or knob, for a user to provide an input (such as turning on or off the light assembly 122 or adjusting the light intensity of the light assembly 122) to the controller 114. In other embodiments, the controller 114 is used to receive commands from the computing device 116 and control the camera 112 and the light assembly 122. An example of controller 114 is described in more detail with reference to FIG. 8.

In this example, the controller 114 is electrically connected to the camera 112, the computing device 116, and the light assembly 122, via, for example, one or more wires or data communication cables. In another possible embodiment, wireless communication is used to communicate between a wireless communication device of the controller 114 and a wireless communication device of the camera 112 and/or the light assembly 122. An example of a wireless communication protocol is the 802.11 a/b/g/n communication protocol. Other embodiments use a custom wireless communication protocol. Wireless communication includes radio frequency communication, infrared communication, magnetic induction communication, or other forms of wireless data communication.

The computing device 116 operates, in some embodiments, to interface with a user, such as a photographer. An example of the computing device 116 is described in more detail with reference to FIG. 9. In some embodiments, the computing device 116 generates a graphical user interface, such as to provide instructions to the user, warn the user of potential problems, display a live video feed preview from camera 112, and display an image after it has been captured.

The computing device 116 also operates to receive input from the user in some embodiments. In some embodiments, the computing device 116 includes a keyboard, a touch pad, a remote control, and a barcode scanner that receive input from the user.

In some alternate embodiments, one or more of the camera 112, the controller 114, and/or the computing device 116 are configured as a single device. For example, in some embodiments, the camera 112 and the controller 114 are configured as a single device that captures digital images and performs control operations of controller 114. In another possible embodiment, the controller 114 and the computing device 116 are a single device. In yet another possible embodiment, the camera 112, the controller 114, and the computing device 116 are all a single device. Other combinations are used in other embodiments. Further, in yet other embodiments additional devices are used to perform one or more functions of these devices.

Referring still to FIG. 1, the station assembly 104 is used to arrange a subject and provide desired light during photography. The station assembly 104 includes a station frame 120 and a light assembly 122.

The station frame 120 is configured to provide a subject space (such as a subject arrangement area 130 in FIGS. 2 and 3) for arranging a subject during photography. As described herein, the subject space can be any location in the station frame 120. An example of the station frame 120 is further described and illustrated with reference to FIGS. 2 and 3.

The light assembly 122 is configured to illuminate a subject arranged in the station frame 120. The light assembly 122 can be synchronized with the camera 112. In some embodiments, the light assembly 122 includes a panel light device 200 configured to generate a diffused light toward the subject at the subject arrangement area. A diffused light is a soft light with neither the intensity nor the glare of direct light. The diffused light is a light that is scattered and comes from all or multiple directions. The diffused light can wrap around the subject and does not cast harsh shadows on the subject, thereby assisting creating pictures with vivid details without sharp shadows that distract attention. In some embodiments, the diffused light includes a non-directional light which provides light from a multitude of different directions. An example of the panel light device 200 is further described and illustrated with reference to FIGS. 2-5.

Figure 2:
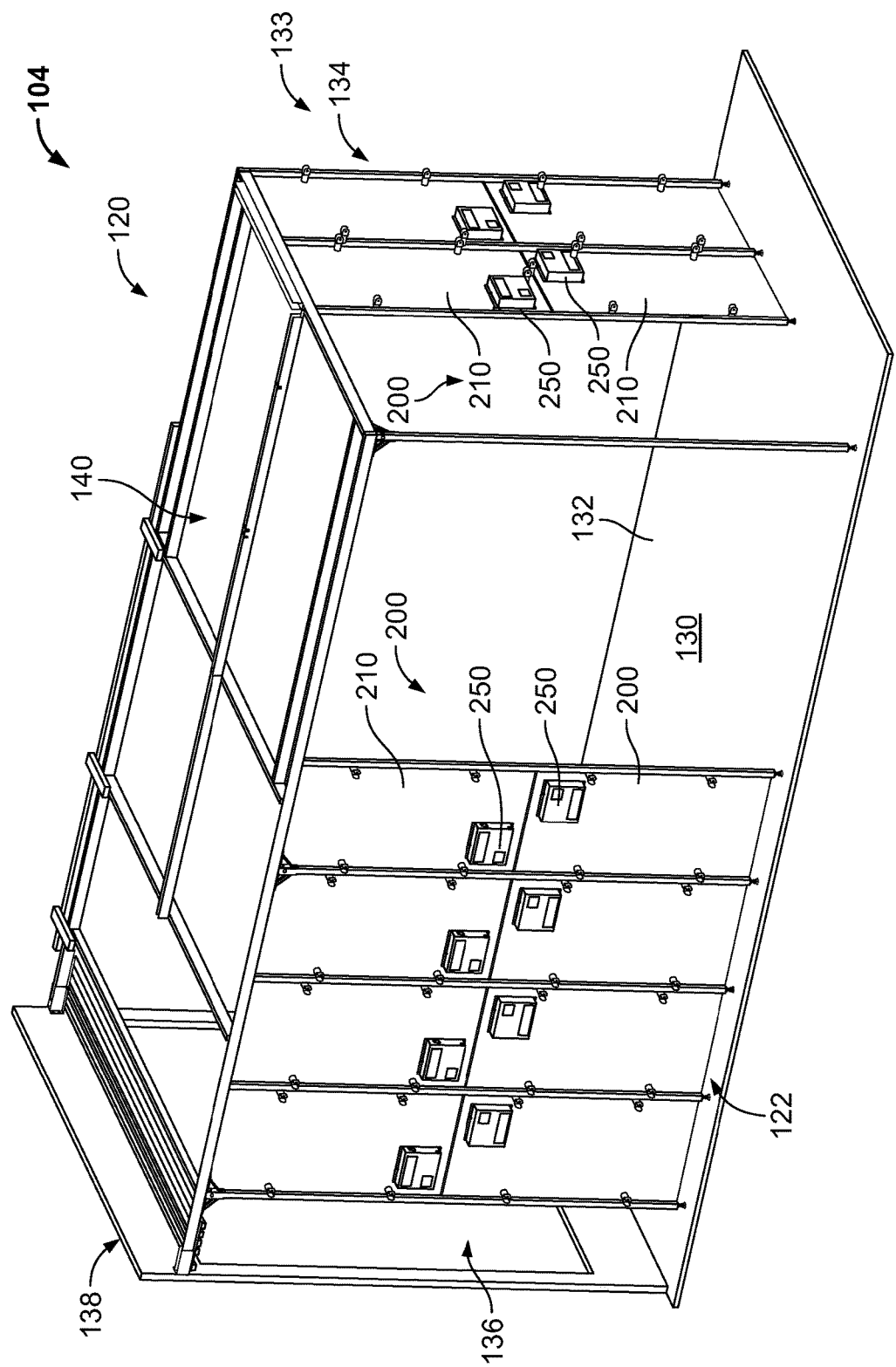
FIG. 2 is a schematic perspective diagram of an example station assembly.
Figure 3:
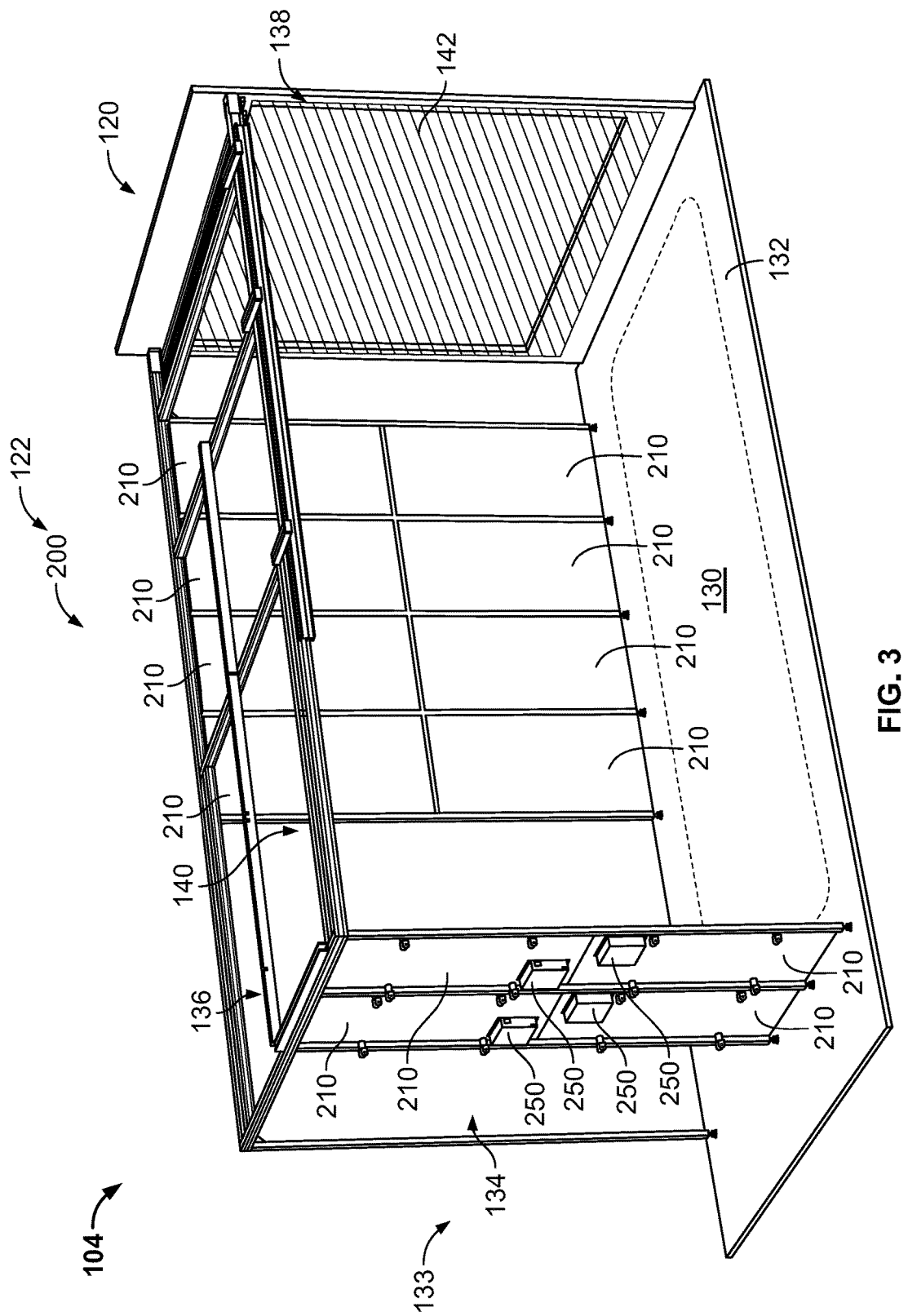
FIG. 3 is another schematic perspective diagram of the station assembly of FIG. 2.

Referring to FIGS. 2 and 3, the station assembly 104 is further described, which includes the station frame 120 and the light assembly 122. In particular, FIG. 2 is a schematic perspective diagram of an example station assembly 104, and FIG. 3 is another schematic perspective diagram of the station assembly 104.

In some embodiments, the station frame 120 provides a floor 132, one or more wall frames 133 (including 134, 136, and 138), and a ceiling frame 140. The floor 132 includes the subject arrangement area 130. In some embodiments, the subject arrangement area 130 can be any location with any size on the floor 132.

The wall frames 133 (including 134, 136, and 138) can be used to mount the light assembly 122 and other devices used for photography. For example, the panel light device 200, other light devices, devices of the image capture system 102, and/or one or more photographic scenes can be mounted to the wall frames 133.

In the illustrated example, a first wall frame 134 provides a structure to which one or more light panels 210 of the panel light device 200 are mounted, and a second wall frame 136 similarly provides a structure to which one or more light panels 210 of the panel light device 200 are mounted.

A third wall frame 138 provides a structure that can be used to support a photographic scene 142, such as a background scene. For example, a photographic scene 142 is hung at a top portion of the third wall frame 138, or attached to the top portion and/or side portions of the third wall frame 138. The photographic scene 142 can be supported in other manners in other examples. The photographic scene 142 provides an area or scenery behind a subject standing in front of the image capture system 102. The subject can be arranged between the image capture system 102 and the photographic scene. In some embodiments, the photographic scene 142 includes a background scene and a floor scene.

The ceiling frame 140 can be used similarly to the wall frames 133. For example, the ceiling frame 140 provides a structure for mounting the light assembly 122 and other devices for photography. For example, the ceiling frame 140 is used to arrange the panel light device 200, other light devices, devices of the image capture system 102, and/or one or more photographic scenes can be mounted to the ceiling frame 140.

In some embodiments, the light assembly 122 includes a panel light device 200. The panel light device 200 can be used as different types of light used for photography. Examples of such different types of light include a main light, a fill light, a background light, an edge light, and other lights suitable for various photographic effects. For example, the panel light device 200 can be selectively operated as one of such different types of light or as two or more of the different types of lights together.

In some embodiments, the panel light device 200 is the only light source as the light assembly 122. In other embodiments, the panel light device 200 can be used with one or more other lights arranged apart from the panel light device 200. In yet other embodiments, the panel light device 200 are primarily used as a subject light for illuminating the subject in the station frame 120 with or without other lights.

The panel light device 200 includes one or more light panels 210. As described herein, the light panels 210 can be arranged and mounted to one or more of the wall frames 133 and the ceiling frame 140. The light panels 210 can be arranged in various configurations. An example structure of the light panel 210 is described and illustrated with reference to FIGS. 4 and 5.

Figure 20:
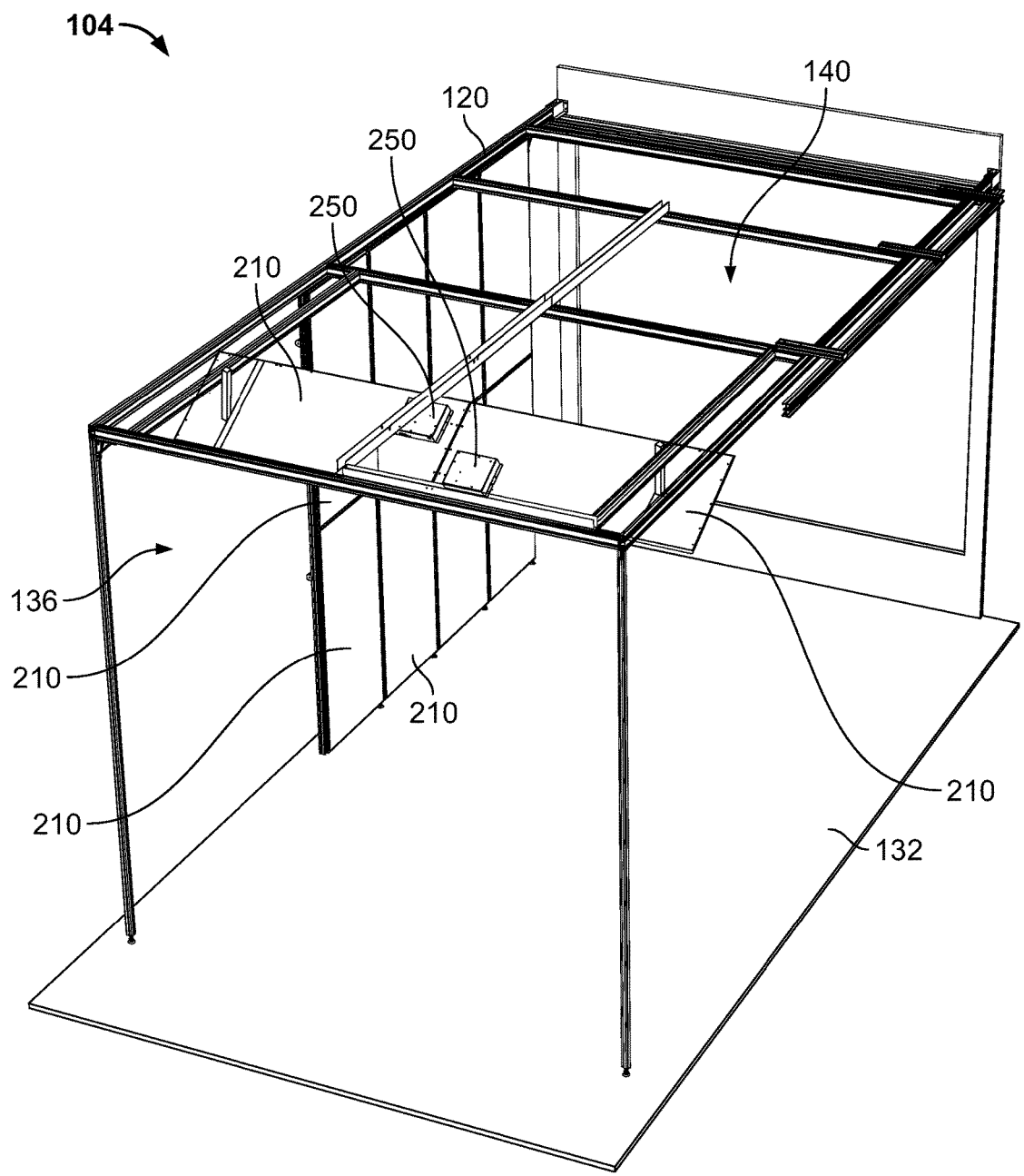
FIG. 20 is a schematic perspective diagram of another example station assembly.

In some embodiments, the light panels 210 are mounted vertically to one or more wall frames 133. In other embodiments, the light panels 210 are mounted horizontally to the ceiling frame 140. In yet other embodiments, the light panels 210 are mounted to one or more of the wall frames 133 and the ceiling frame 140 at an angle. In the illustrated example of FIGS. 2 and 3, eight light panels 210 are arranged in two rows and four columns and mounted to a larger side of the station frame 120 (such as the second wall frame 136), and four light panels 210 are arranged in two rows and two columns and mounted to a smaller side of the station frame 120 (such as the first wall frame 134). In the example of FIG. 20, eight light panels 210 are arranged in two rows and four columns and mounted to a larger side of the station frame 120 (such as the second wall frame 136), and two light panels 210 are mounted to the ceiling 140. In some embodiments, the light panels 210 at the ceiling 140 can be arranged at an angle. Such an angle can be adjusted as necessary, such as to generally direct the light panels 210 toward the subject.

It is understood that various configurations of light panels are possible, such as by changing the number of light panels, the size of each light panel, the light intensity of each light panel, the light characteristics (such as light temperature) of each light panel, the arrangement of light panels, and/or the control scheme of each light panel.

The light panels 210 arranged in different walls of the station frame 120 can provide different types of light or light effects. For example, the light panels 210 arranged on the first wall frame 134 can work as a main light for generally illuminating a subject while the light panels 210 arranged on the second wall frame 136 can function as a fill light for removing undesirable shadows on the subject. Alternatively, the light panels 210 arranged on the first wall frame 134 can work as a fill light while the light panels 210 arranged on the second wall frame 136 can function as a main light.

In some embodiments, each of the light panels 210 is configured to generate diffused light as a whole. As described herein, the light panels 210 of the panel light device 200 can be independently operated and thus provide a variety of lighting effects during photography. For example, the panel light device 200 can adjust a lighting ratio in a captured photograph by selectively controlling the light panels, such as by choosing which of the light panels 210 are turned on or off for any given exposure that the camera operates to capture.

Although it is primarily described in this document that the light panels 210 are mounted to the walls and/or ceiling, it is also possible that the light panels 210 are configured as standalone panels set up around the subject during photography, or arranged vertically with a stand or other structures that supports the light panels vertically. An example operation of the light panels 210 is described in more detail with reference to FIGS. 11-17.

Figure 4:
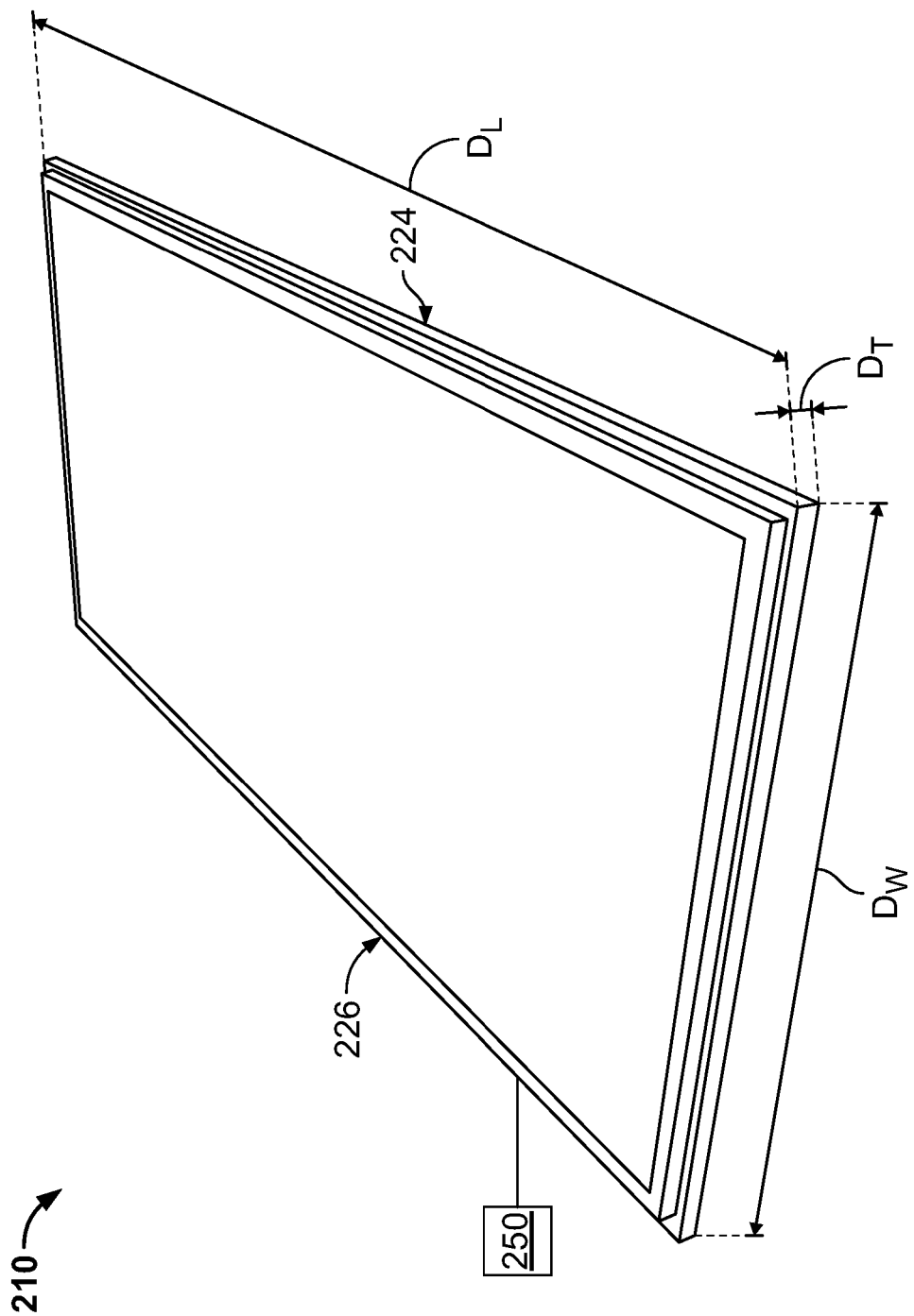
FIG. 4 is a schematic perspective view of an example light panel.
Figure 5:
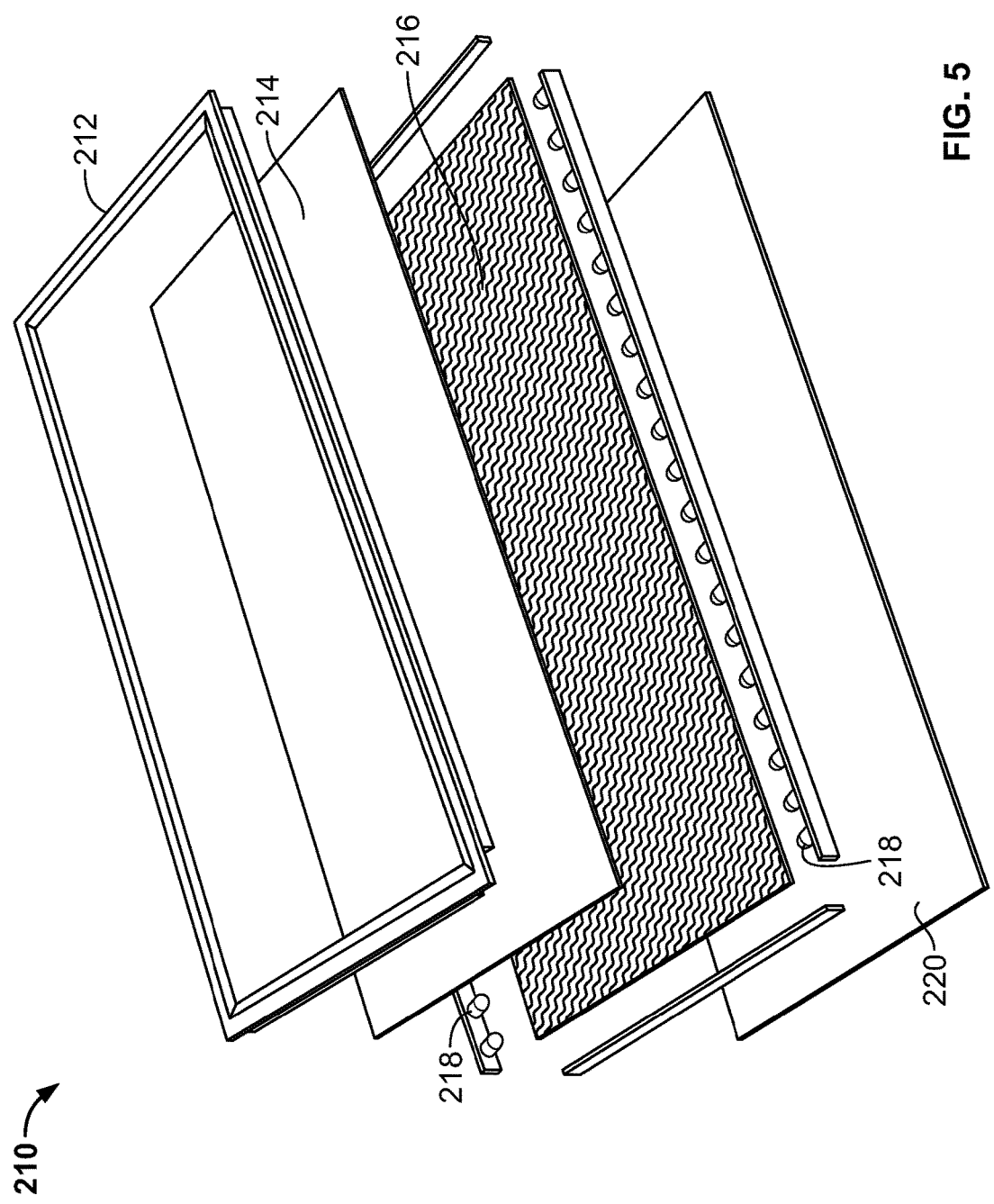
FIG. 5 is an exploded view of the light panel of FIG. 4.

Referring to FIGS. 4 and 5, an example light panel 210 is described in more detail. In particular, FIG. 4 is a schematic perspective view of an example light panel 210, and FIG. 5 is an exploded view of the light panel 210.

As illustrated in FIG. 4, the light panel 210 is configured in the form of a slim panel that is conveniently mounted to the station frame 120, occupying much less space than typical light sources, such as flashtubes with light modifiers, such as reflectors, reflective umbrellas, and soft boxes. By way of example, the light panel 210 has a thickness $D_T$ that ranges between about 5 mm and about 30 mm, a width $D_W$ that ranges between about 100 mm and about 1500 mm, and a length $D_L$ that ranges between 100 mm and about 1500 mm. Other ranges of the thickness, width, and length of the light panel 210 are also possible in other embodiments.

The light panel 210 can be of various types. In one example, the light panel is configured as a LED panel. In other examples, other types of lighting elements can be used to make the light panel.

In some embodiments, each light panel 210 can be controlled via a power control unit 250 (also shown in FIGS. 2 and 3). The power control unit 250 is provided to each light panel 210 and configured to supply power to the LED strips (such as the LED strips 218) in the light panel 210. An example of the power control unit 250 is described in more detail with reference to FIG. 6.

As described herein, the light panel 210 can be operated in different modes of operation, such as a continuous light mode and a strobe light mode (FIG. 12), and provide different lighting effects without requiring additional devices that would otherwise be required with typical light sources.

The light panel 210 is configured to generate a consistent light in a normal operation. In addition, the light panel 210 can generate a diffused light without adjustable light intensity. As such, a set of one or more light panels 210, when mounted to a wall frame of the station frame 120, can simulate natural, diffused, and consistent sunlight coming through a wall of windows facing the north.

Such a natural window light effect provided by the light panels 210 can help reducing undesirable shadows on a subject and provide softening effect on the subject. The natural window light effect of the light panels 210 can also be more forgiving in terms of light exposure, in contrast to a point source of light. For example, the natural window light effect can provide a good quality exposure in a large physical area.

The light panels 210 can eliminate needs of using natural lighting as a light source for photography. Natural sunlight has several disadvantages when used as a light source of photography. For example, when using natural lighting as a light source for high quality portraits, a high level of artistic and technical skills are required to operate camera equipment. Further, desirable natural lighting for portraits is typically available for a limited period of time and may not be consistent and repeatable over time. In contrast, the light panels 210 can conveniently provide a natural and diffused light effect by replicating a window light in indoor studio arrangement.

Further, the light panels 210 help reducing space, cost, and energy required for light sources in a photography studio by removing typical flash light sources and light modifiers that require a larger space, are more expensive, and consume more energy.

Figure 12:
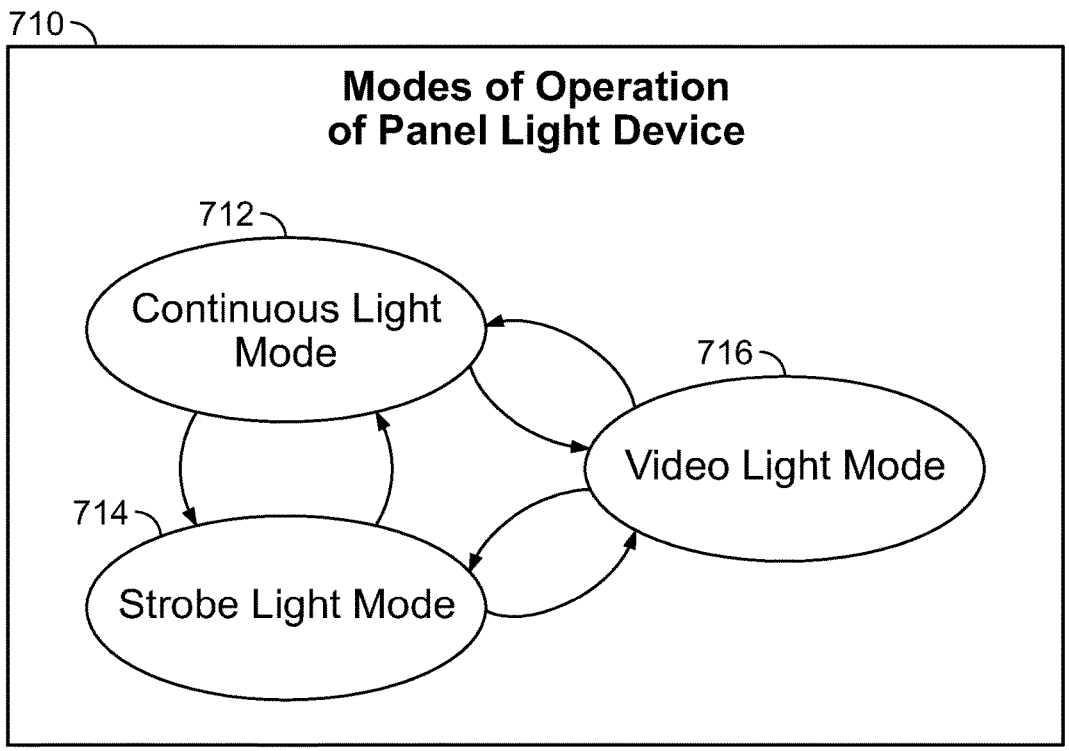
FIG. 12 illustrates example modes of operation of a panel light device.

As described herein, in some embodiments, the light panel 210 can be overdriven for a short period of time to be operated as a strobe light or flash light. Such an overdriving operation can be performed to operate the light panel 210 in a strobe light mode as illustrated in FIG. 12.

As illustrated in FIG. 5, the light panel 210 includes a body frame 212, a cover plate 214, a light guide plate 216, one or more LED strips 218, and a body plate 220.

The body frame 212 is an edge cover configured to protect other components of the light panel 210 and provide thermal conductivity to the light panel 210. The body frame 212 can be made of various materials. In some embodiments, the body frame 212 is made of aluminum, which provides improved heat dissipation. In other embodiments, plastic, such as PVC, can be used for the body frame 212.

The cover plate 214 is a transparent or semi-transparent plate that is placed on or over the light guide plate 216. In some embodiments, the cover plate 214 includes a light diffusing structure or element that diffuses light output. The cover plate 214 can include an anti-glaring structure or element. The cover plate 214 can be made of various materials, such as PMMA (acrylic) or PC (polycarbonate).

The light guide plate 216 is configured to achieve a uniform light illumination. In some embodiments, a reflective plate or polarizing film is provided to the light guide plate 216.

The LED strips 218 are arranged on opposite edges 224 and 226 of the light panel 210. In some embodiments, the LED strips 218 are arranged adjacent and along the edges of the light panel (such as the light guide plate 216 and/or the cover plate 214) such that the light from the LED strips 218. In some embodiments, the LED strips 218 can be oriented to face inwards of the panel. In some embodiments, the LED strips 218 can be controlled to have different light temperatures.

The body plate 220 is arranged back of the light guide plate 216 and configured to cooperate with the body frame 212 to house the components of the light panel 210. In some embodiments, the body plate 220 includes a flexible layer, such as a sponge mat or foam, which is configured to protect the components of the light panel 210 and improve heat dissipation from the light panel 210.

Figure 6:
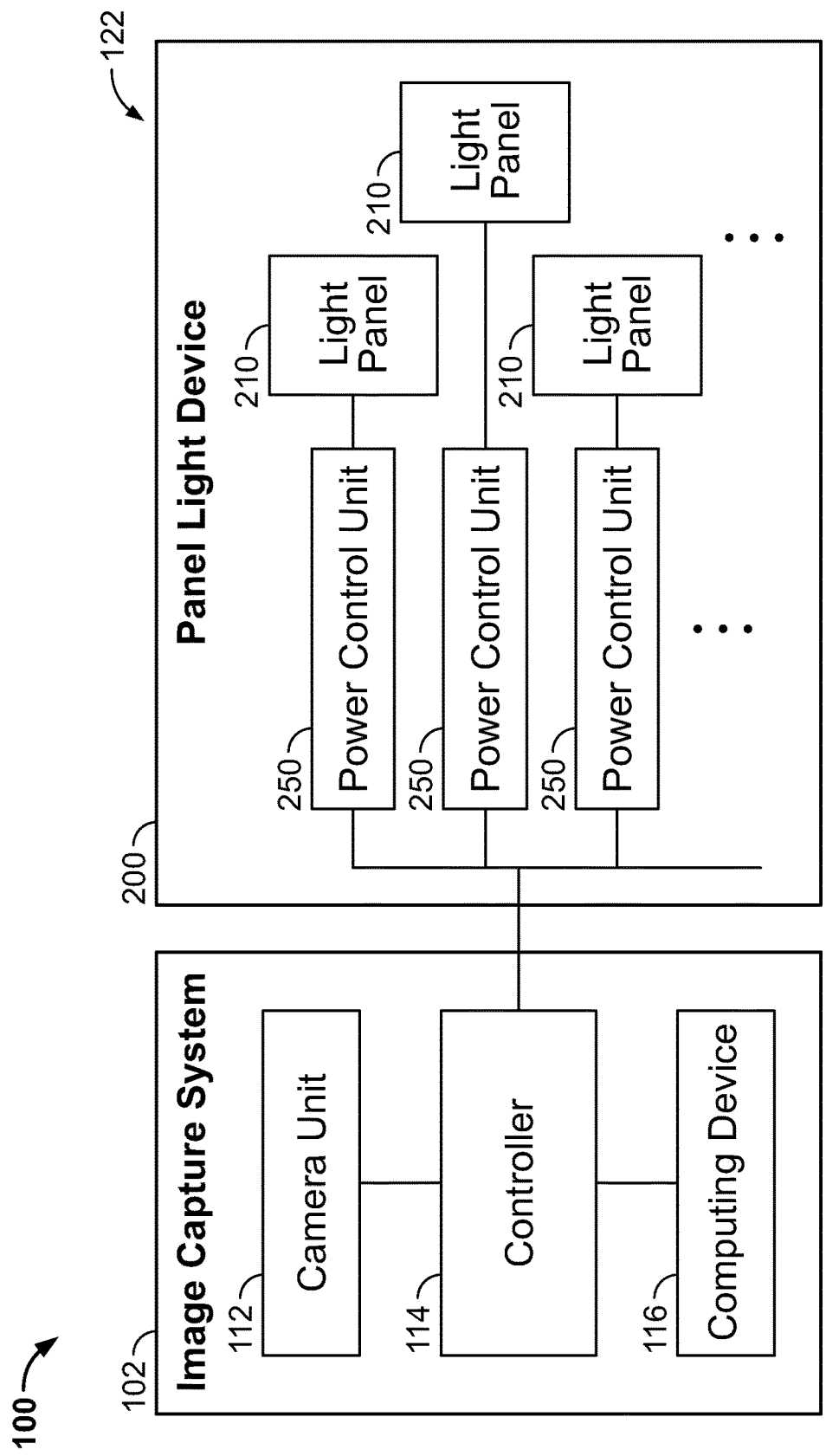
FIG. 6 is a functional diagram of the photography system of FIG. 1.

FIG. 6 is a functional diagram of the photography system 100. As described herein, the photography system 100 includes the image capture system 102, which includes the camera 112, the controller 114, and the computing device 116. The photography system 100 further includes the light assembly 122, which includes the panel light device 200. The panel light device 200 includes a plurality of light panels 210 and a plurality of power control units 250 for the light panels 210.

The power control unit 250 is connected to the light panels 210 and configured to supply power to the light panels 210. The power control unit 250 can be controlled by the controller 114. In the illustrated example of FIGS. 2 and 3, each of the power control units 250 is connected to, and configured to supply power to, a single light panel 210. In other examples, at least one of the power control units 250 is configured to be associated with two or more of the light panels 210. An example of the power control unit 250 is further described with reference to FIG. 10.

Figure 7:
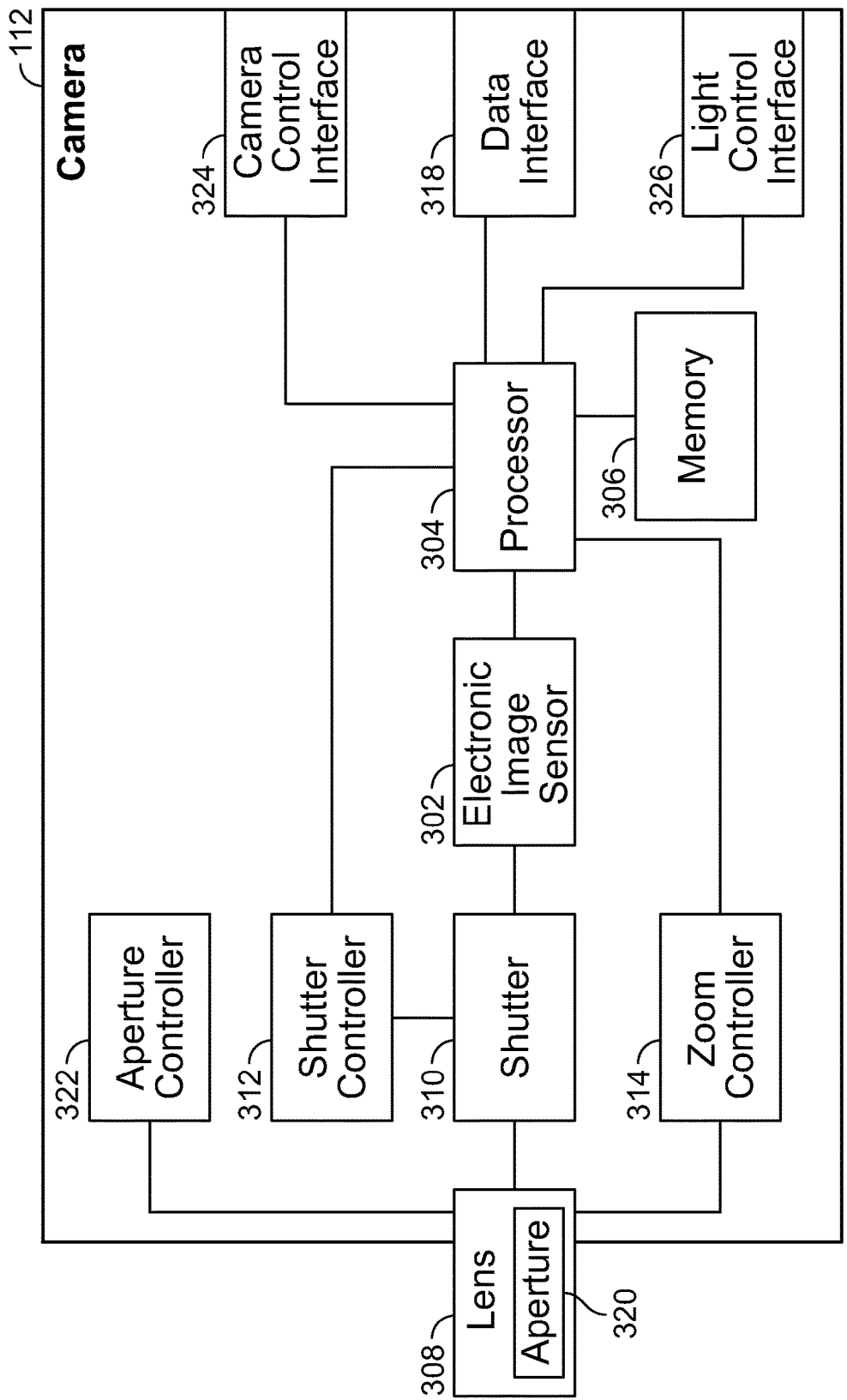
FIG. 7 is a schematic block diagram of an example camera.

FIG. 7 is a schematic block diagram of an example camera 112. The camera 112 is typically a digital camera including at least an electronic image sensor 302 for converting an optical image to an electric signal, a processor 304 for controlling the operation of the camera 112, and a memory 306 for storing the electric signal in the form of digital image data.

An example of the electronic image sensor 302 is a charge-coupled device (CCD). Another example of the electronic image sensor 302 is a complementary metal-oxide-semiconductor (CMOS) active-pixel sensor. The electronic image sensor 302 receives light from a subject and background and converts the received light into electrical signals. The signals are converted into a voltage, which is then sampled, digitized, and stored as digital image data in the memory 306.

The memory 306 can include various different forms of computer readable storage media, such as random access memory. In some embodiments, the memory 306 includes a memory card. A wide variety of memory cards are available for use in various embodiments. Examples include: a CompactFlash (CF) memory card (including type I or type II), a Secure Digital (SD) memory card, a mini Secure Digital (mini SD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

In some embodiments, the camera 112 includes three main sections: a lens 308, a mechanical shutter 310, and a CCD element 302. Generally, the CCD element 302 has relatively rapid exposure speeds.

The lens 308 is located in front of the shutter 310 and is selected to provide the appropriate photographic characteristics of light transmission, depth of focus, etc. The lens 308 has an aperture 320 through which light travels into the camera body. The size ("diaphragm") of the aperture 320 is expressed in f-stops and adjustable through an aperture controller 322. The aperture controller 322 is used to mechanically adjust the size of the aperture 320 to set different f-stops of the digital camera 112.

A zoom controller 314 is also provided in some embodiments to mechanically adjust the lens 308 to cause the digital camera 112 to zoom in and out on a subject. The zoom controller 314 typically includes a motor that adjusts the lens 308 accordingly.

In some embodiments, the lens 308 is selected between 30 and 350 mm, with the image taken at an f-stop generally in the range of f5 to f22. This provides a zone focus for the image. It also generally eliminates concerns regarding ambient light. However, it will be appreciated that other numbers of lenses, focusing, and f-stops may be employed in connection with the present invention.

The camera 112 provides a camera control interface 324 for controlling operation of the camera 112. In addition, in some embodiments, the camera control interface 324 can be used to control the light assembly 122. For example, an operation of the shutter 310 of the camera 112 can be synchronized with an operation of the light assembly 122.

In some embodiments, the camera control interface 324 includes a shutter release for activating the shutter and capturing a photograph, a controller (e.g., jog dial) for adjusting aperture and/or shutter speed settings, a shooting mode controller (e.g., shooting mode dial) for selecting shooting type (e.g., Program Auto Exposure, Aperture-Priority, Shutter-Priority, and Manual), a zoom controller (e.g., a zoom ring) for zooming in and out, a focus controller (e.g., focus ring) for manually adjusting focus, an ISO setting button for adjusting ISO settings, and other buttons, controls, switches, and levers for changing different photography settings and features. In other embodiments, the camera control interface 324 is at least partially implemented on a touch-sensitive display of the camera 112.

For example, a photographer uses the camera control interface 324 to control the lens 308 and the shutter 310. To control the shutter, the processor 304 can receives a corresponding user input through the camera control interface 324 and generate a signal (e.g., a shutter release signal or a shutter speed adjustment signal) that is communicated to the shutter controller 312 of the camera 112. Upon receiving a user input of controlling the aperture, an aperture adjustment signal can be generated from the processor 304 and communicated to the aperture controller 322. Upon receiving a user input of zooming, a zooming signal can be generated from the processor 304 and communicated to the zoom controller 314. Other embodiments can use other methods and devices to initiate the image capture and control various features of the camera.

In some embodiments, the digital camera 112 includes a data interface 318. The data interface 318 is a data communication interface that sends and receives digital data to communicate with another device. For example, in some embodiments, the data interface 318 receives image capture messages from another device that instructs the digital camera 112 to capture one or more digital images. The data interface 318 is also used in some embodiments to transfer captured digital images from the memory 306 to another device. Examples of the data interface 318 are USB interfaces.

In some embodiments, the camera 112 includes a light control interface 326 configured to connect one or more lights and synchronize operation of the lights with capturing of photographs. In some alternative embodiments, the light control interface 326 allows the camera 112 to directly control the operation of the light assembly 122. In such embodiments, the light assembly 122 can be connected to the camera 112 through the light control interface 326 and controlled by the camera 112. For example, a photographer can at least partially control the light assembly 122 through the camera control interface 324 such that a shutter release of the camera 112 is synchronized with illumination of the light assembly 122. In this example, the light control interface 326 can provide a physical interface or port.

The light control interface 326 can be of various forms. In one example, the light control interface 326 is a hot shoe, which is typically a mounting point on the top of the camera to attach a flash unit and other compatible accessories. The light assembly 122 can be connected to the hot shoe of the camera 112 through a cord or cable. In another example, the light control interface 326 is a wireless communication interface which wirelessly connects between the camera 112 and the light assembly 122.

In some embodiments, the light control interface 326 is a send only interface that does not receive return communications from the lights. Other embodiments permit bidirectional communication. The light control interface 326 is operable to selectively illuminate one or more lights at a given time. The operation of the camera 112, such as a shutter release, is synchronized with the illumination of the light assembly 122.

Figure 8:
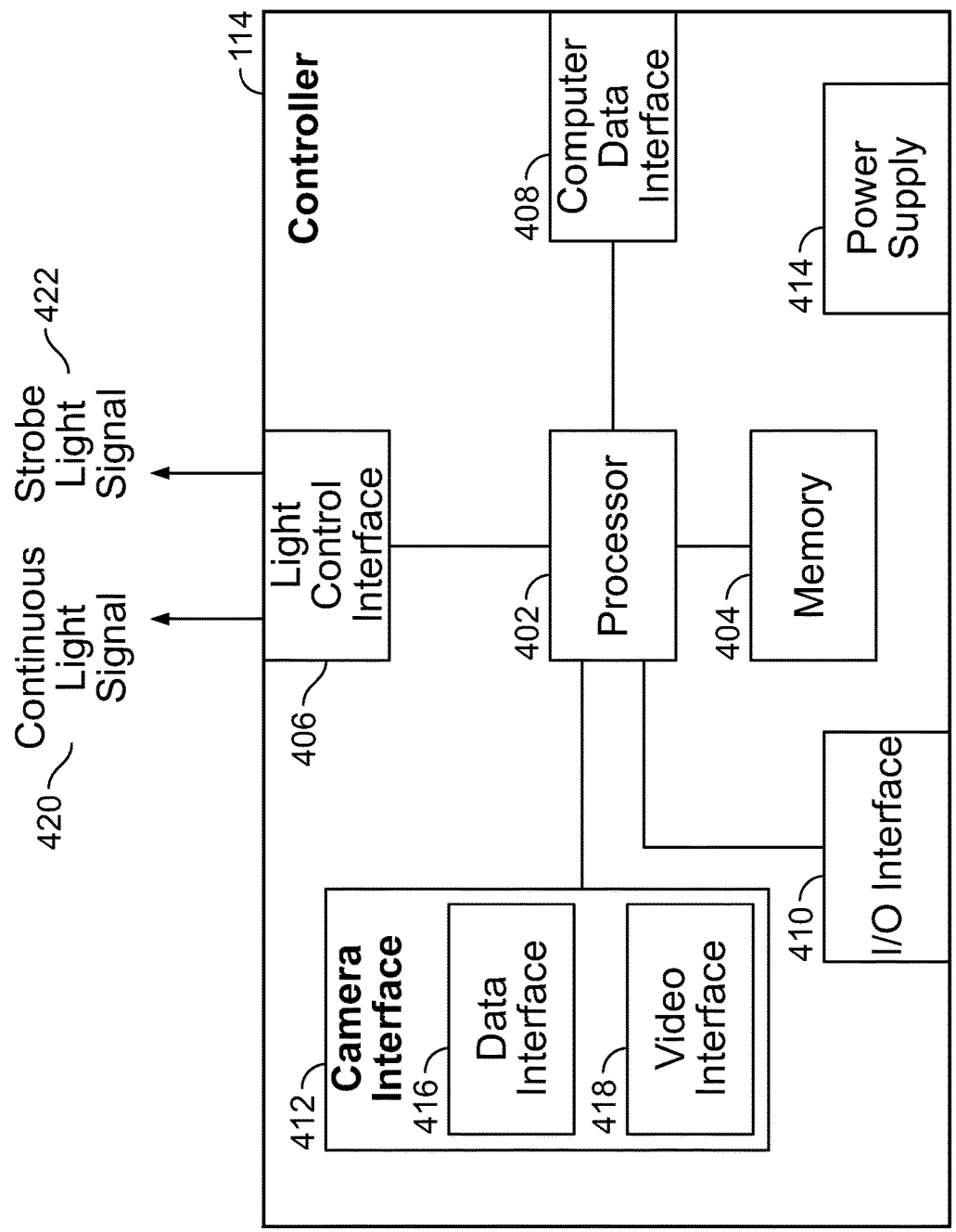
FIG. 8 is a schematic block diagram of an example controller.

FIG. 8 is a schematic block diagram of an example controller 114. In this example, the controller 114 includes a processor 402, a memory 404, a light control interface 406, a computer data interface 408, an input/output interface 410, a camera interface 412, and a power supply 414. In some embodiments, the camera interface 412 includes a data interface 416 and a video interface 418.

The processor 402 performs control operations of the controller 114, and interfaces with the memory 404. Examples of suitable processors and memory are described herein.

The light control interface 406 allows the controller 114 to control the operation of one or more lights, such as the light assembly 122. In some embodiments, the light control interface 406 is a send only interface that does not receive return communications from the lights. Other embodiments permit bidirectional communication. The light control interface 406 is operable to selectively illuminate one or more of the light panels 210 at a given time. The controller 114 operates to synchronize the illumination of the light assembly 122 with the operation of the camera 112.

As described herein, the controller 114 operates to transmit a continuous light signal 420 or a strobe light signal 422 to the panel light device 200 through the light control interface 460. The continuous light signal is used to operate the panel light device 200 in a continuous light mode, and the strobe light signal is used to operate the panel light device 200 in a strobe light mode.

The computer data interface 408 allows the controller 114 to send and receive digital data with the computing device 116. An example of the computer data interface 408 is a universal serial bus interface, although other communication interfaces are used in other embodiments, such as a wireless or serial bus interface.

One or more input devices, such as a remote control, are coupled the processing device 402 through the input/output interface 410. The input devices can be connected by any number of the input/output interfaces 410 in various embodiments, such as a parallel port, serial port, game port, universal serial bus, or wireless interface.

The camera interface 412 allows the controller 114 to communicate with the camera 112. In some embodiments, the camera interface 412 includes a data interface 416 that communicates with the data interface 318 of the camera 112 (shown in FIG. 7). Examples of such interfaces include universal serial bus interfaces. Other embodiments include other interfaces.

In some embodiments a power supply 414 is provided to receive power, such as through a power cord, and to distribute the power to other components of the photography station 100, such as through one or more additional power cords. Other embodiments include one or more batteries. Further, in some embodiments, the controller 114 receives power from another device.

In some embodiments, the controller 114 is arranged and configured to provide a trigger pulse at the start of the integration of the first image. This pulse may be used by the controller 114 to synchronize the light assembly 122. Various types of triggers and pulses may be used.

Figure 9:
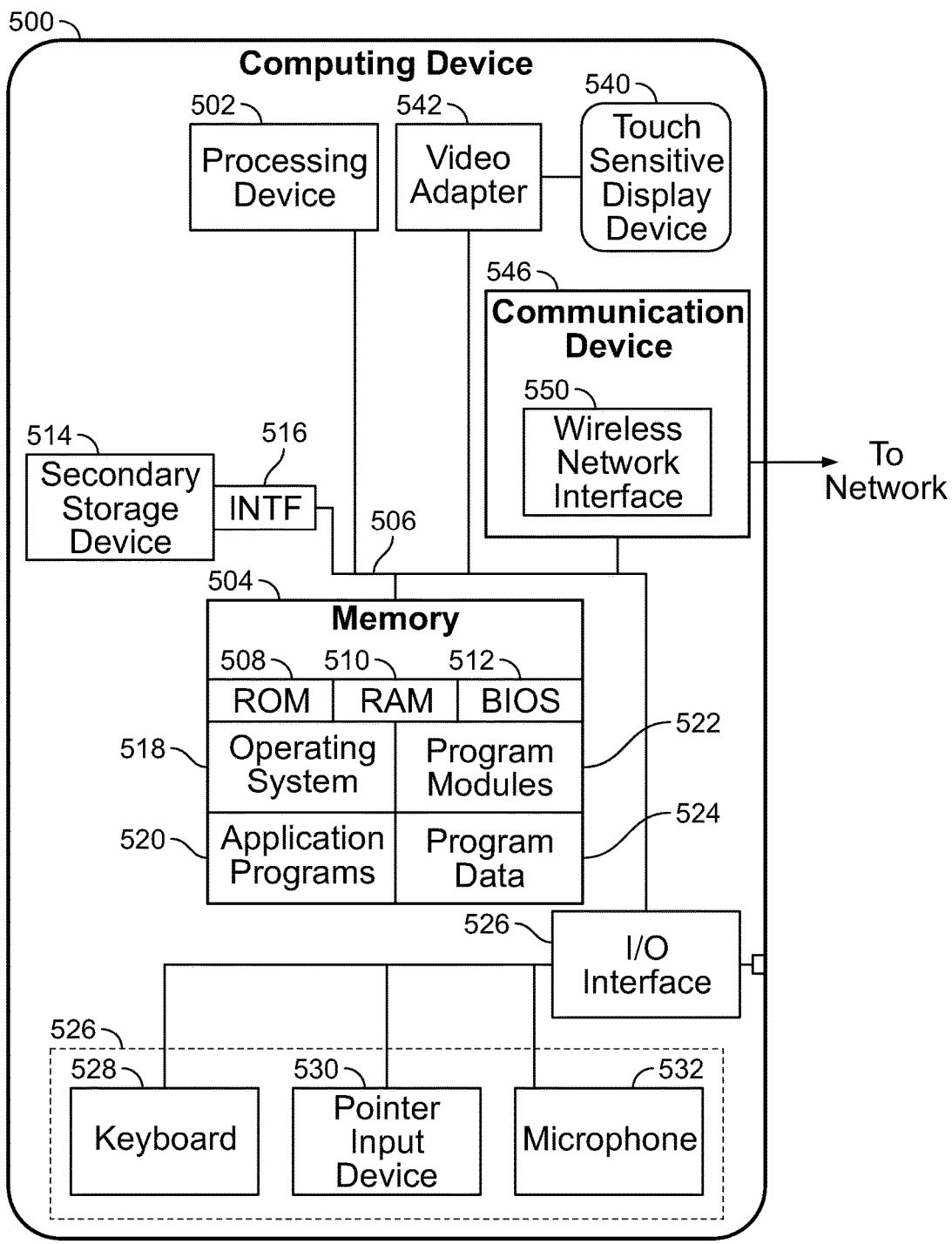
FIG. 9 illustrates an exemplary architecture of a computing device which can be used in the present disclosure.

FIG. 9 illustrates an exemplary architecture of a computing device 500 which can be used in the present disclosure. The computing device 500 illustrated in FIG. 9 is used to execute the operating system, application programs, and software modules (including the software engines) described herein.

The computing device 500 can be of various types. In some embodiments, the computing device 500 is a desktop computer, a laptop computer, or other devices configured to process digital instructions. In other embodiments, the computing device 500 is a mobile computing device. Examples of the computing device 500 as a mobile computing device include a mobile device (e.g., a smart phone and a tablet computer), a wearable computer (e.g., a smartwatch and a head-mounted display), a personal digital assistant (PDA), a handheld game console, a portable media player, a ultra-mobile PC, a digital still camera, a digital video camera, and other mobile devices.

In some examples, at least a portion of the computing device 500 can be used to implement computing devices used in the photography station 100. It is also recognized that at least some of the architecture illustrated in FIG. 9 can also be implemented in various computing devices used to achieve aspects of the present disclosure. For example, the controller 114 and the computing device 116 can be configured similarly to the architecture of FIG. 9.

The computing device 500 includes, in some embodiments, at least one processing device 502, such as a central processing unit (CPU). A variety of processing devices are available from a variety of manufacturers, for example, Intel or Advanced Micro Devices. In this example, the computing device 500 also includes a system memory 504, and a system bus 506 that couples various system components including the system memory 504 to the processing device 502. The system bus 506 is one of any number of types of bus structures including a memory bus, or memory controller; a peripheral bus; and a local bus using any of a variety of bus architectures.

The system memory 504 includes read only memory 508 and random access memory 510. A basic input/output system 512 containing the basic routines that act to transfer information within the computing device 500, such as during start up, is typically stored in the read only memory 508.

The computing device 500 also includes a secondary storage device 514 in some embodiments, such as a hard disk drive, for storing digital data. The secondary storage device 514 is connected to the system bus 506 by a secondary storage interface 516. The secondary storage devices and their associated computer readable media provide nonvolatile storage of computer readable instructions (including application programs and program modules), data structures, and other data for the computing device 500.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 514 or memory 504, including an operating system 518, one or more application programs 520, other program modules 522, and program data 524.

In some embodiments, the computing device 500 includes input devices to enable a user to provide inputs to the computing device 500. Examples of input devices 526 include a keyboard 528, a pointer input device 530, a microphone 532, and a touch sensitive display 540. Other embodiments include other input devices. The input devices are often connected to the processing device 502 through an input/output interface 538 that is coupled to the system bus 506. These input devices 526 can be connected by any number of input/output interfaces, such as a parallel port, serial port, game port, or a universal serial bus. Wireless communication between input devices and interface 538 is possible as well, and includes infrared, BLUETOOTH® wireless technology, 802.11a/b/g/n, cellular, or other radio frequency communication systems in some possible embodiments.

In this example embodiment, a touch sensitive display device 540 is also connected to the system bus 506 via an interface, such as a video adapter 542. The touch sensitive display device 540 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 540, the computing device 500 can include various other peripheral devices (not shown), such as speakers or a printer.

The computing device 500 further includes a communication device 546 configured to establish communication across the network. In some embodiments, when used in a local area networking environment or a wide area networking environment (such as the Internet), the computing device 500 is typically connected to the network through a network interface, such as a wireless network interface 550. Other possible embodiments use other wired and/or wireless communication devices. For example, some embodiments of the computing device 500 include an Ethernet network interface, or a modem for communicating across the network. In yet other embodiments, the communication device 546 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The computing device 500 typically includes at least some form of computer-readable media. Computer readable media includes any available media that can be accessed by the computing device 500. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 500. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 9 is also an example of programmable electronics, which may include one or more such computing devices, and when multiple computing devices are included, such computing devices can be coupled together with a suitable data communication network so as to collectively perform the various functions, methods, or operations disclosed herein.

Figure 10:
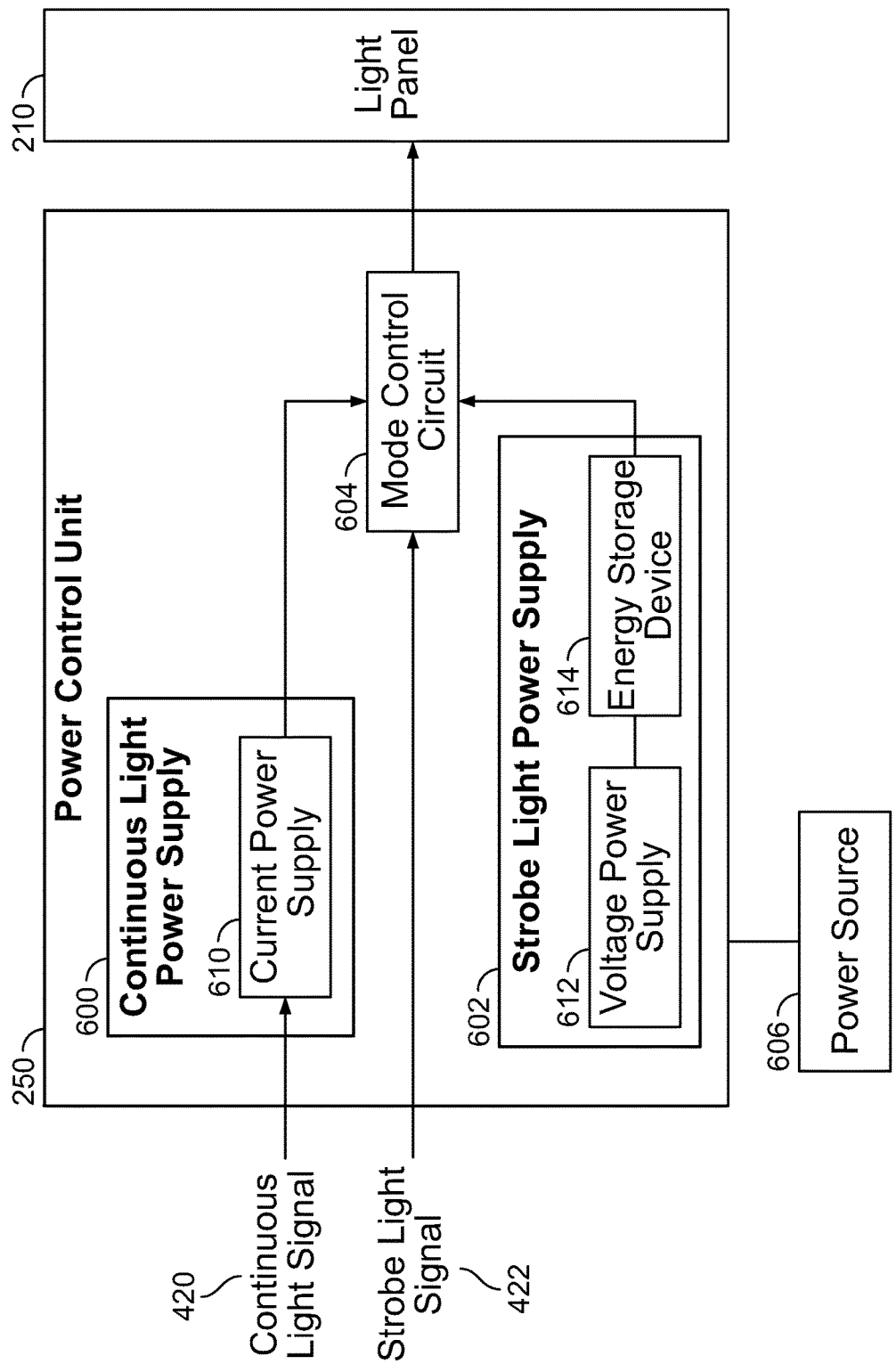
FIG. 10 is a schematic block diagram of an example power control unit for each light panel.

FIG. 10 is a schematic block diagram of an example power control unit 250 for each light panel 210. In this example, the power control unit 250 includes a continuous light power supply 600, a strobe light power supply 602, and a mode control circuit 604. In some embodiments, the power control unit 250 is supplied with power from an external power source 606.

The power control unit 250 is connected to the light panel 210 and configured to control power supply to the light panel 210 based on a signal from the controller 114. The power control unit 250 can receive two different signals, such as a first signal 420 and a second signal 422, to control the light panel 210 in two different modes of operation. In this document, the first signal 420 is also referred to as a continuous light signal 420 because it is used to control the light panel 210 in a continuous light mode, and the second signal 422 is also referred to as a strobe light signal 422 because it is used to control the light panel 210 in a strobe light mode.

The continuous light power supply 600 operates to supply power to the mode control circuit 604 so that the power is used by the light panel 210 in the continuous light mode. In some embodiments, the continuous light power supply 600 receives the continuous light signal 420 from the controller 114 and supply power to the mode control circuit 604 based on the continuous light signal 420. In other embodiments, the continuous light signal 420 can be directly transmitted to the mode control circuit 604 so that the mode control circuit 604 operates, based on the continuous light signal 420, to provide the power from the continuous light power supply 600 to the light panel 210.

In some embodiments, the continuous light power supply 600 includes a current power supply 610. The current power supply 610 operates to supply a current based on the continuous light signal 420 from the controller 114. In some embodiments, the current power supply 610 is configured to supply a constant current based on the continuous light signal 420 in order to the light panel 210 generates a constant light.

The strobe light power supply 602 operates to supply power to the mode control circuit 604 so that the power is used by the light panel 210 in the strobe light mode. In some embodiments, the strobe light power supply 602 includes a voltage power supply 612 and an energy storage device 614.

The voltage power supply 612 operates to apply a voltage to the energy storage device 614 so that the energy storage device 614 stores energy therein. In some embodiments, the voltage power supply 612 is configured to apply a constant voltage to the energy storage device 614. In some embodiments, the energy storage device 614 can include one or more capacitors that are connected to the voltage power supply 612, and thus store electrical energy in an electric field generated by the voltage power supply 612.

The mode control circuit 604 operates to selectively supply power from the continuous light power supply 600 and the strobe light power supply 602 to the light panel 210. In some embodiments, based on the continuous light signal 420 and the strobe light signal 422, the mode control circuit 604 operates as a switch so that either the power (e.g., a constant current) from the continuous light power supply 600 or the power (e.g., an electrical energy stored in the energy storage device 614) from the strobe light power supply 602 is provided to the light panel 210. In other embodiments, the mode control circuit 604 is configured to supply a constant current from the current power supply 610 to the light panel 210 until or unless the mode control circuit 604 receives the strobe light signal 422 from the controller 114. If the strobe light signal 422 is transmitted to the mode control circuit 604, the mode control circuit 604 can stop supplying the power from the current power supply 610 to the light panel 210 and operate to supply the power from the energy storage device 614 to the light panel 210. After a short period of the strobe light mode, the mode control circuit 604 operates to supply the constant current from the current power supply 610 to the light panel 210 again so that the light panel 210 returns to the continuous light mode.

In some embodiments, the continuous light signal 420 is a pulse-width modulation signal. The pulse-width modulation signal is transmitted to the current power supply 610 and used to enable the current power supply 610 to supply a constant current to the light panel 210 (through the mode control circuit 604) so that the light panel 210 operates in the continuous light mode where a constant light is generated. In some embodiments, such a constant light can be a dimmed light or ambient light.

The strobe light signal 422 is transmitted to the mode control circuit 604 and used to enable the mode control circuit 604 to switch a power supply source from the current power supply 610 to the energy storage device 614. The energy storage device 614 stores and releases an electrical energy sufficient to drive the light panel 210 to generate a strobe light, which is also referred to herein as a flash light. With the energy from the energy storage device 614, the light panel 210 can illuminate the subject with a very strong light for a very short period of time, as with a xenon flash light. In some embodiments, the electrical energy stored in the energy storage device 614 can overdrive the light panel 210 for a short period of time so that the light panel 210 can generate a strobe light.

Figure 11:
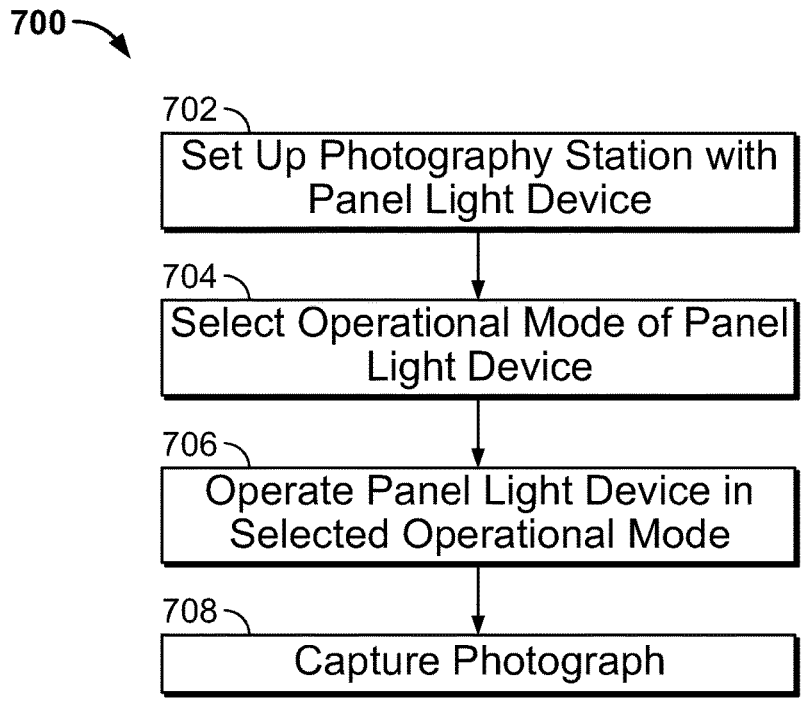
FIG. 11 is a flowchart of an example method for operating the photography station of FIG. 1.

FIG. 11 is a flowchart of an example method 700 for operating the photography station 100. In this example, the method 700 begins at operation 702 in which the photography station 100 is set up with the panel light device 200.

At operation 704, a mode of operation of the panel light device 200 is selected. As described herein, the panel light device 200 can be operated in a plurality of modes of operation, such as a continuous light mode of operation and a strobe light mode of operation. Examples of such modes of operation are further described with reference to FIG. 12. In some embodiments, a mode of operation of the panel light device 200 is manually selected by a user, such as a photographer. For example, the user can select a mode of operation through a user interface of the controller 114, a user interface of the computing device 116, and/or a user interface of the camera 112. In other embodiments, a mode of operation of the panel light device 200 is automatically selected during photography. For example, a particular mode of operation of the panel light device 200 (e.g., a strobe light mode) is synchronized with a shutter operation of the camera 112, so that the panel light device 200 automatically switches to the particular mode of operation at the time that the shutter of the camera 112 is released.

At operation 706, the panel light device 200 is operated in the selected mode of operation. At operation 708, the camera 112 operates to capture a photograph as the panel light device 200 is in the selected mode of operation.

FIG. 12 illustrates example modes of operation 710 of the panel light device 200. In this example, the modes of operation in which the panel light device 200 can operate include a continuous light mode 712 and a strobe light mode 714. The panel light device 200 can selectively operate in either the continuous light mode 712 or the strobe light mode 714.

In the continuous light mode 712, the panel light device 200 operates to continuously provide a light for the ambient light in a studio. In some embodiments, the panel light device 200 generates a consistent light density in the continuous light mode 712. The continuous light mode 712 allows a constant exposure on the scene and enables the camera to expose based on ambient lighting conditions. In some embodiments, the light panels 210 are selectively adjusted to provide comfortable lighting on the subject in the continuous light mode 712, thereby preventing undesired facial expression (e.g., squinting eyes) of the subject that would be caused by harsh lighting on the subject. The continuous light mode 712 can be advantageous to a subject who is light sensitive. In the continuous light mode 712, the panel light device 200 can provide the photography station with a desired level of ambient light by adjusting the light intensity of the panel light device 200 (i.e., the light panels 210). An example method for operating the continuous light mode is further described with reference to FIG. 13.

In the strobe light mode 714, the panel light device 200 creates a brighter illumination for a very short period of time. In the strobe light mode 714, the panel light device 200 can operate in a manner similar to a xenon flash light. In some embodiments, the light from the panel light device 200 in the strobe light mode can be synchronized to the capturing operation (e.g., a shutter operation) of the camera 112.

The strobe light from the panel light device 200 in the strobe light mode 714 can reduce the effect of ambient lights on capturing a photograph. The light in the strobe light mode 714 has a light intensity that overpowers undesirable ambient lights which cannot be easily controlled during photography. Such undesirable ambient lights include security lights that cannot be turned off.

In some embodiments, as described herein, the strobe light signal 422 from the controller 114 is transmitted to at least one of the power control units 250, and causes at least one light panels 210 associated with the at least one of the power control units 250 to operate in the strobe light mode. One example of the strobe light signal 422 includes a pulse signal. As described herein, a moment in time that the strobe light signal 422 is generated or transmitted can be synchronized with a shutter operation of the camera 112.

As such, in the strobe light mode 714, the light panels 210 can be operated to strobe for a very short pulse, approximating xenon-flash strobe lights. The ambient light for the scene can be at a very comfortable level for the subject, and at the time of image capture, a short burst of light illuminated the scene. The light in the strobe light mode can also overpower any other non-ideal ambient light sources in the environment, such as security lights or other sources. As described herein, an energy storage system (e.g., the energy storage device 614) is used for storage from a constant voltage power supply. When the system requires a strobe event, the stored energy is released to the light panels 210 all at once, to create a strobe effect. For example, LED elements used in the light panels 210 respond fast enough to be used as a strobe light source in photography.

In addition, the panel light device 200 can operate in a video light mode 716. In the video light mode 716, the light panels 210 can be adjusted to generate a light intensity that is compatible with a video capture mode of the camera 112. In some embodiments, the light panels 210 are controlled to generate a higher light intensity (e.g., a brighter light) in a continuous manner than a light intensity of the continuous light mode 712. In this regard, in some embodiments, the video light mode 716 can be considered to be part of the continuous light mode 712 without different light intensity settings.

As described herein, one example of lighting elements for the light panels 210 includes LED elements. With this configuration, the light panels 210 can be driven by a constant current power supply, which operates the LED elements at a stable level without creating interference with video camera sensor readout such as rolling shutter or interlaced scanning. Thus, the light panels 210 can provide a constant, stable light that can allow a video camera to capture quality videos.

Figure 13:
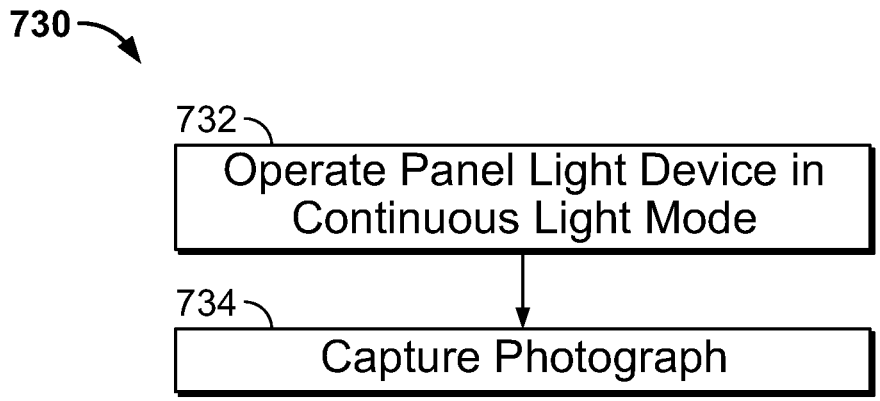
FIG. 13 is a flowchart of an example method for operating the panel light device in a continuous light mode.

FIG. 13 is a flowchart of an example method 730 for operating the continuous light mode 712. In some embodiments, the method 730 can be performed by the controller 114 and/or the power control unit 250 in the panel light device 200. In other embodiments, other devices in the system 100 can be used to at least partially perform the method 730 with or without the cooperation of the controller 114 and/or the power control unit 250.

At operation 732, the controller 114 transmits a continuous light signal 420 to the power control unit 250. In some embodiments, the continuous light signal 420 is a pulse-width modulation signal and is provided to the current power supply 610 of the power control unit 250. In some embodiments, the current power supply 610 can supply a constant current in direct proportion to the continuous light signal 420 or in inverse proportion to the continuous light signal 420. The constant current from the current power supply 610 is supplied to the mode control circuit 604 of the power control unit 250.

At operation 734, upon receiving the continuous light signal 420, the power control unit 250 operates to supply a constant current to the associated light panel 210. As described herein, in some embodiments, the current from the current power supply 610 is supplied to the light panel 210 through the mode control circuit 604. The mode control circuit 604 allows the current to be supplied to the light panel 210 until the mode control circuit 604 receives a strobe light signal 422, at which time the mode control circuit 604 stops the current from being supplied from the current power supply 610 to the light panel 210.

Figure 14:
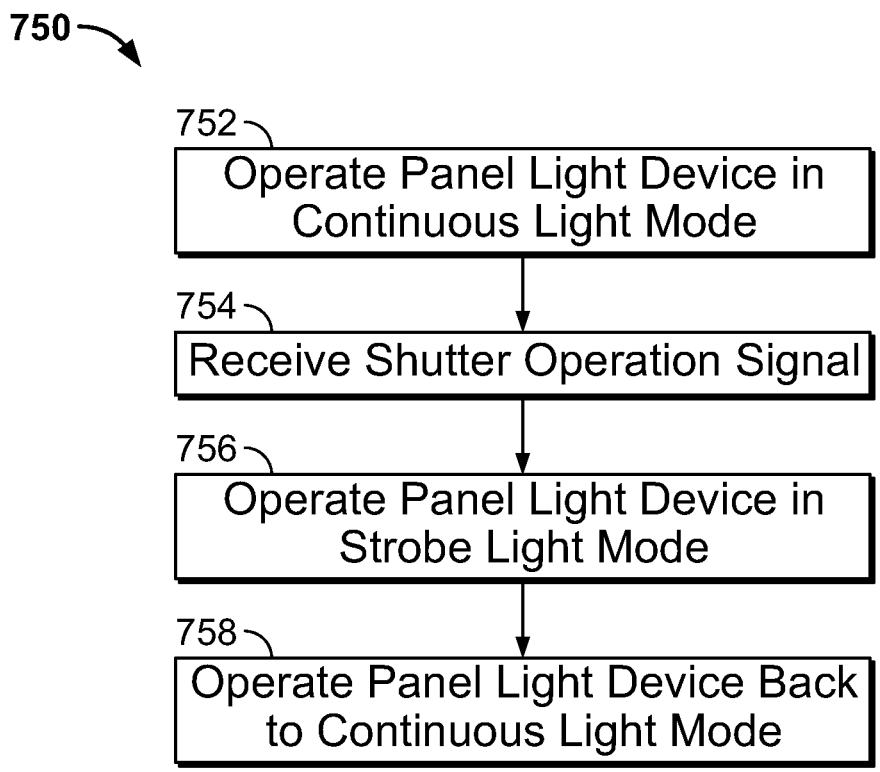
FIG. 14 is a flowchart of an example method for operating the panel light device in a strobe light mode.

FIG. 14 is a flowchart of an example method 750 for operating the panel light device 200 in the strobe light mode 714. In some embodiments, the method 750 can be performed by the controller 114 and/or the power control unit 250 in the panel light device 200. In other embodiments, other devices in the system 100 can be used to at least partially perform the method 750 with or without the cooperation of the controller 114 and/or the power control unit 250.

At operation 752, the controller 114 operates the panel light device 200 in the continuous light mode 712 to provide an ambient light in the photography station, which simulates a constant, diffused sunlight coming through a wall of windows from the north.

At operation 754, the controller 114 receives a signal of a shutter operation of the camera 112. In some embodiments, when a photographer presses a shutter button of the camera 112, a signal representative of the shutter input is generated and transmitted to the controller 114 to inform that the shutter of the camera is being operated.

At operation 756, the controller 114 operates the panel light device 200 in the strobe light mode 714 based on the signal of the shutter operation. In some embodiments, the controller 114 synchronizes the strobe light mode 714 with the shutter operation. The strobe light mode 714 of the panel light device 200 can be synchronized with the shutter operation in various methods. Examples of such synchronization are described and illustrated with reference to FIG. 15.

At operation 758, the controller 114 operates the panel light device 200 back to the continuous light mode 712. In some embodiments, the panel light device 200 returns to the continuous light mode 712 once the shutter operation of the camera 112 has been done. In other embodiments, the panel light device 200 returns to the continuous light mode 712 as soon as the strobe light mode 714 is over. Other methods are also possible in other embodiments.

Figure 15:
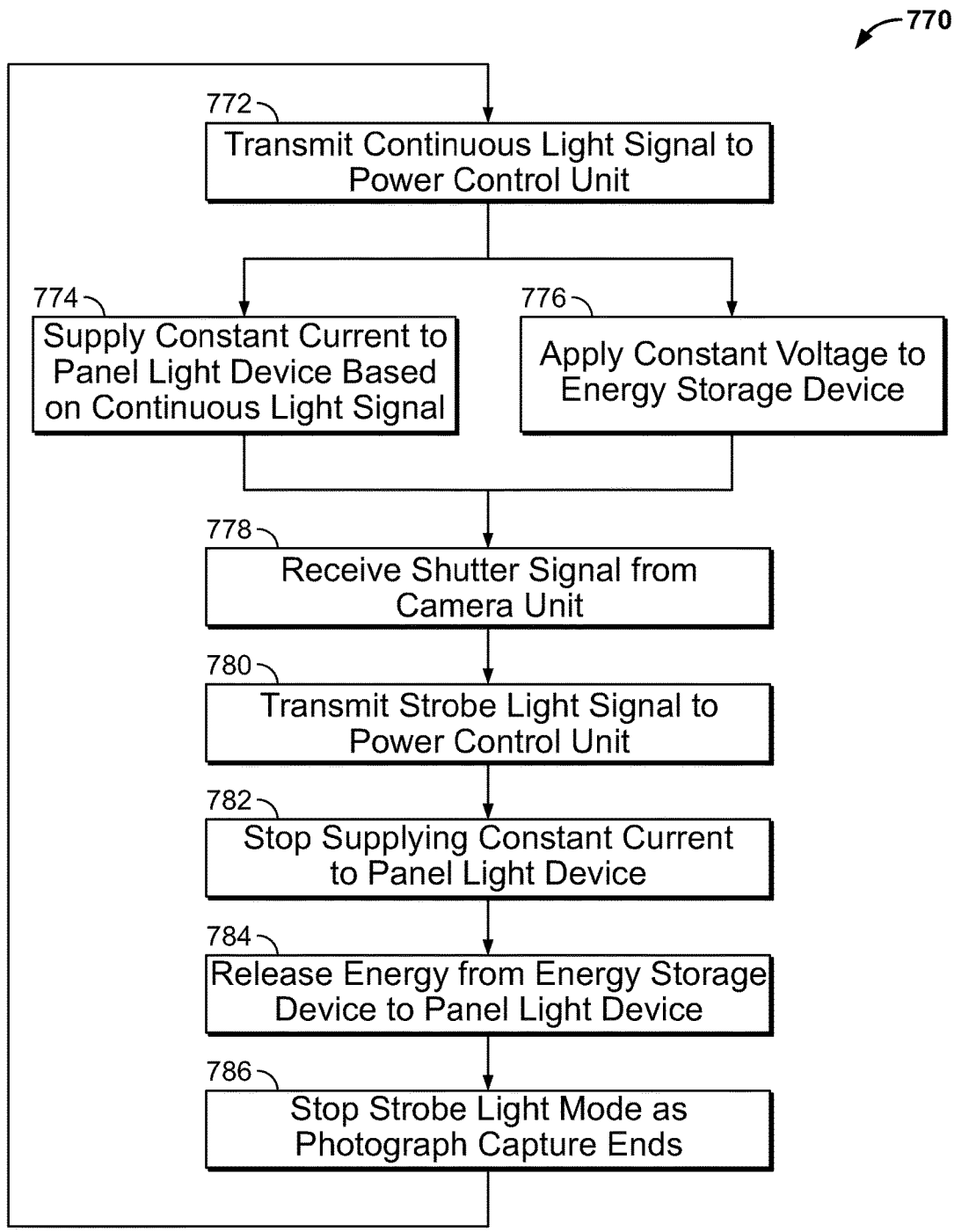
FIG. 15 is a flowchart of another example method for operating the panel light device in the strobe light mode while the panel light device is in the continuous light mode.

FIG. 15 is a flowchart of another example method 770 for operating the panel light device 200 in the strobe light mode 714 while the panel light device 200 is in the continuous light mode 712. In some embodiments, the method 750 can be performed by the controller 114 and/or the power control unit 250 in the panel light device 200. In other embodiments, other devices in the system 100 can be used to at least partially perform the method 750 with or without the cooperation of the controller 114 and/or the power control unit 250.

At operation 772, the controller 114 transmits a continuous light signal 420 to the power control unit 250. In some embodiments, the continuous light signal 420 is a pulse-width modulation signal and is provided to the current power supply 610 of the power control unit 250. In some embodiments, the current power supply 610 can supply a constant current in direct proportion to the continuous light signal 420 or in inverse proportion to the continuous light signal 420. The constant current from the current power supply 610 is supplied to the mode control circuit 604 of the power control unit 250.

At operation 774, upon receiving the continuous light signal 420, the power control unit 250 operates to supply a constant current to the associated light panel 210 of the panel light device 200, thereby enabling the light panel 210 to operate in the continuous light mode 712. As described herein, in some embodiments, the current from the current power supply 610 is supplied to the light panel 210 through the mode control circuit 604. The mode control circuit 604 allows the current to be supplied to the light panel 210 until the mode control circuit 604 receives a strobe light signal 422, at which time the mode control circuit 604 stops the current from being supplied from the current power supply 610 to the light panel 210.

At operation 776, while the power control unit 250 supplies a constant current to the light panel 210 to operate the light panel 210 in the continuous light mode 712, the power control unit 250 applies a constant voltage across the energy storage device 614. Therefore, an electric energy is saved in the energy storage device 614 while the light panel 210 operates in the continuous light mode 712. The saved energy is to be used to operate the light panel 210 in the strobe light mode 714, as described below.

At operation 778, the controller 114 receives a shutter signal from the camera 112. The shutter signal indicates that the shutter of the camera 112 is operated. In some embodiments, when a photographer presses a shutter button of the camera 112, the shutter signal is generated and transmitted to the controller 114 to inform that the shutter of the camera is being operated.

At operation 780, upon receiving the shutter signal, the controller 114 transmits a strobe light signal 422 to the power control unit 250. In some embodiments, the strobe light signal 422 is transmitted to the mode control circuit 604 in the power control unit 250, and the power control unit 250 can operate to switch between the continuous light mode 712 and the strobe light mode 714 of the light panel 210.

At operation 782, upon receiving the strobe light signal 422, the power control unit 250 operates to stop supplying the constant current to the light panel 210 of the panel light device 200. Therefore, the light panel 210 stops operating in the continuous light mode 712. In some embodiments, upon receiving the strobe light signal 422, the mode control circuit 604 can open a circuit that connects the constant current to the light panel 210 so that the light panel 210 is not supplied with the constant current that has allowed the light panel 210 to operate in the continuous light mode 712.

At operation 784, the power control unit 250 operates to release the energy saved in the energy storage device 614 to the light panel 210 so that the light panel 210 operates in the strobe light mode 714. The energy released to the light panel 210 amounts to drive the light panel 210 to generate a flash light that appears as a xenon flash light. In some embodiments, the electrical energy stored in the energy storage device 614 can overdrive the light panel 210 for a short period of time so that the light panel 210 can generate such a flash light.

At operation 786, the strobe light mode 715 ends as the capturing of a photograph has completed. In some embodiments, the strobe light mode 714 ends as the energy stored in the energy storage device 614 has been completely used up or substantially used so that the energy left in the energy storage device 614 is not enough to drive the light panel 210 in the strobe light mode 714. In other embodiments, the power control unit 250 operates to stop supplying the energy from the energy storage device 614 to the light panel 210 when a predetermined threshold is met. Such a predetermined threshold can be at least one of a duration of the strobe light mode, a duration of a shutter release, a level of the energy left in the energy storage device, and an amount of the energy supplied to the light panel.

When the strobe light mode 714 ends, the method 770 can return to the operation 772 so that the light panel 210 returns to the continuous light mode 712.

Figure 16:
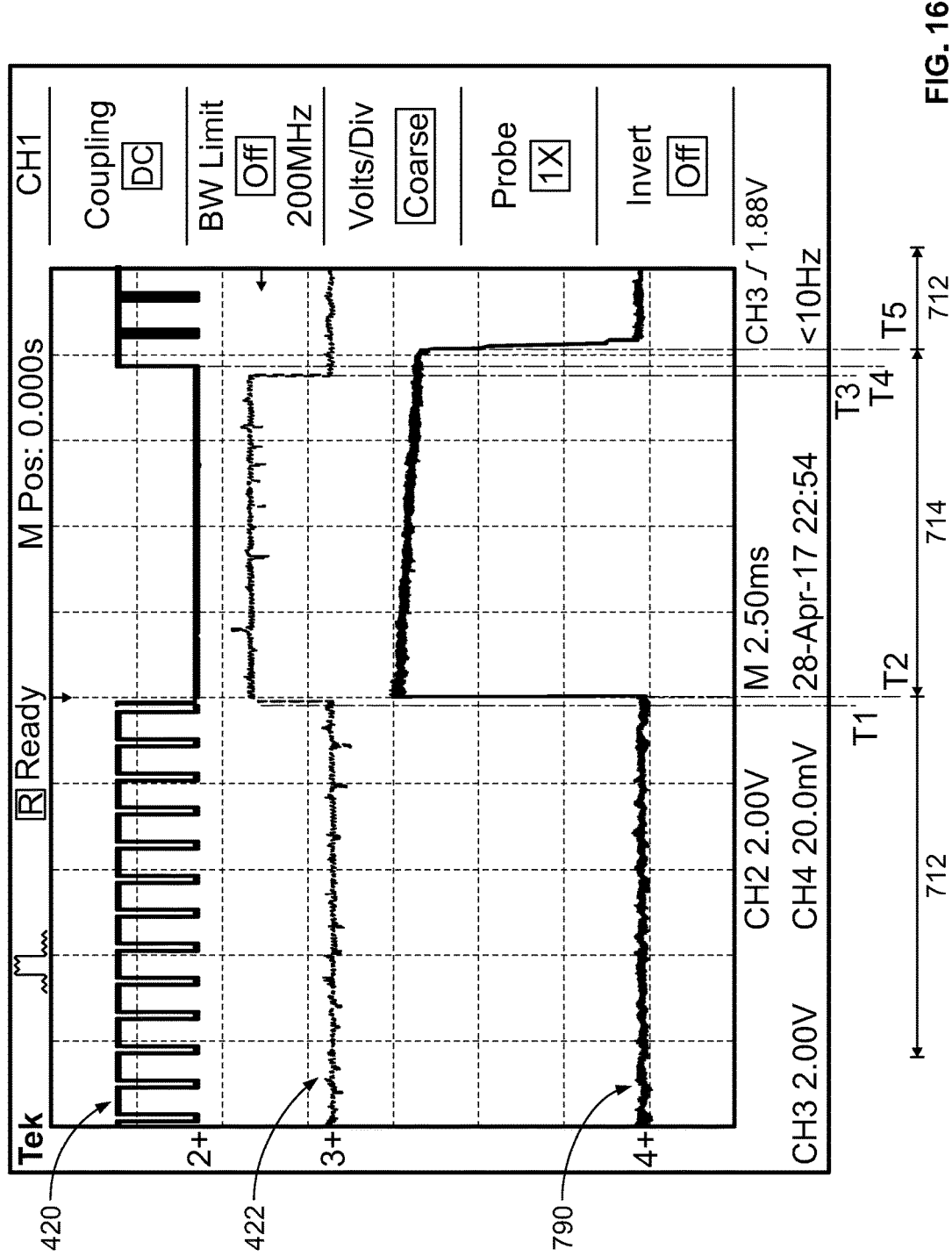
FIG. 16 illustrates an example relationship between a continuous light signal, a strobe light signal, and a light output signal over time.

FIG. 16 illustrates examples of the continuous light signal 420, the strobe light signal 422, and a light output signal 790 over time. As illustrated, the continuous light signal 420 is a pulse-width modulation signal and transmitted to the panel light device 200 until a first time T1. The panel light device 200 is in the continuous light mode 712 by the first time T1.

In this example, the strobe light signal 422 is a rectangular pulse signal starting at the first time T1 and ending at a third time T3. This pulse signal can cause the power control unit 250 to release the energy from the energy storage device 614 to the panel light device 200 so that the panel light device 200 operates in the strobe light mode 714. In one example, the pulse duration of the strobe light signal 422 can be about 10 ms. Other pulse durations of the strobe light signal 422 can be also possible.

The pulse signal can generally define a duration of the strobe light mode 714. As illustrated, the light output signal 790, which can represent a light intensity from the light panel 210, indicates that a light intensity that is much higher than the light intensity in the continuous light mode is created in the strobe light mode between the second time T2 and a fifth time T5. Therefore, the strobe light mode 714 can generally be defined as between the second time T2 and the fifth time T5. Although the strobe light signal 422 ends at the third time T3 shortly before the fifth time T5, the strobe light mode 714 can continue until the fifth time T5 due at least in part to signal lag. In other embodiments, the panel light device 200 is controlled to continue the strobe light mode 714 until the fifth time T5 in order to allow the shutter a desired amount of light. In some embodiments, the fifth time T5 can be controlled to be adjusted for various purposes, such as in view of a shutter operation of the camera 112.

Once the strobe light signal 422 is terminated at the third time T3, the continuous light signal 420 returns. In this example, a fourth time T4 that the continuous light signal 420 is back is slightly later than the third time T3 that the strobe light signal 422 ends, due at least in part to signal lag.

Figure 17:
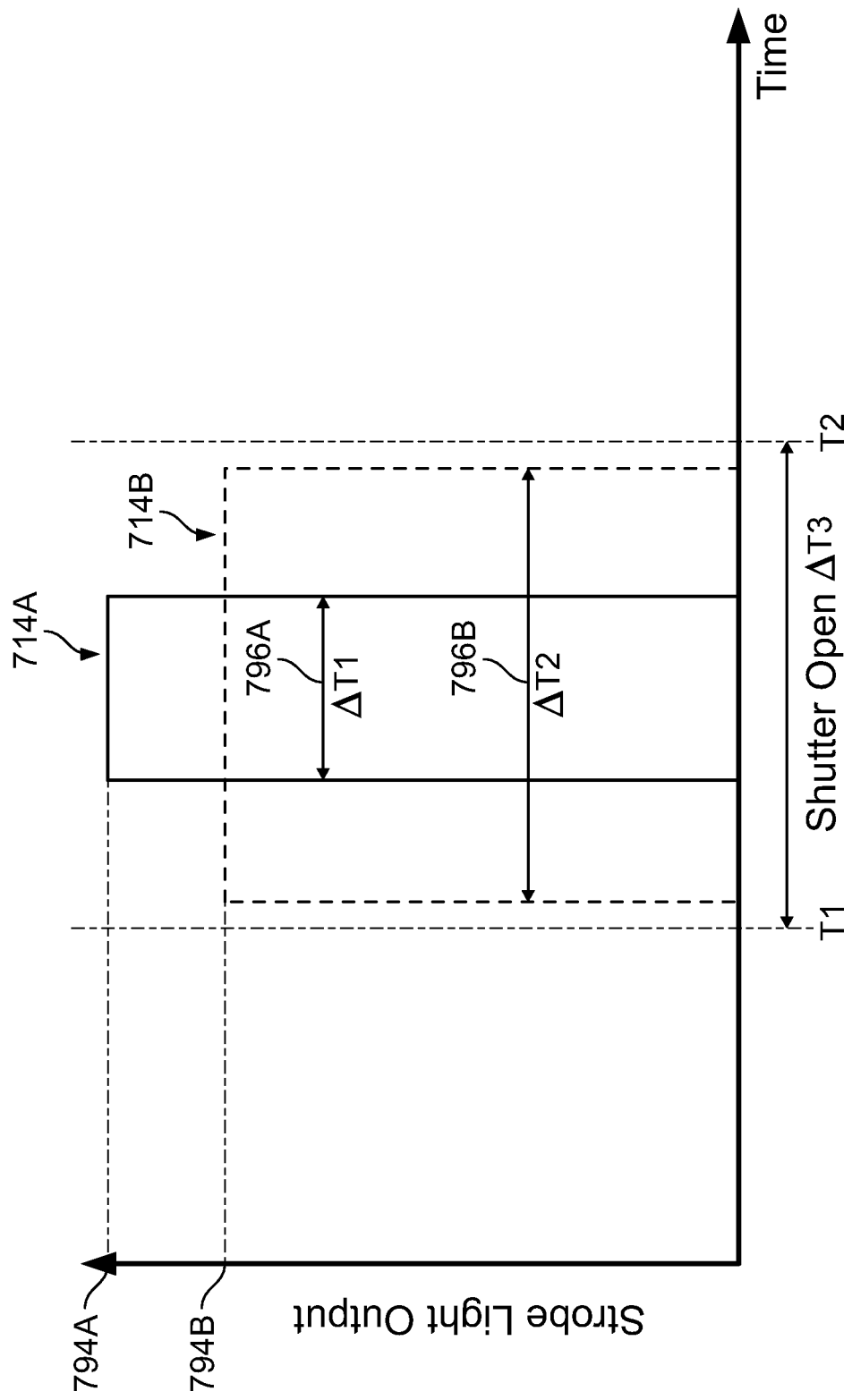
FIG. 17 illustrates an example relationship between a strobe light signal and a shutter operation of the camera.

FIG. 17 illustrates an example relationship between the strobe light signal 422 and the shutter operation of the camera 112. As illustrated, a shutter characteristic (e.g., an effective shutter speed) can vary based on characteristics (e.g., duration and intensity) of the strobe light signal 422 and characteristics (e.g., duration) of the shutter being open.

In the illustrated example, the shutter of the camera 112 is open between a first time T1 and a second time T2. The strobe light mode 714 of the panel light device 200 can be adjusted to provide different shutter characteristics. For example, a first strobe light mode 714A has a first light intensity 794A for a first time period $\Delta T1$, and a second strobe light mode 714B has a second light intensity 794B for a second time period $\Delta T2$, which are different from the first light intensity 794A and the first time period $\Delta T1$. In the first strobe light mode 714A, an effective shutter speed 796A can be defined based on the first time period $\Delta T1$ with or without regard to the actual duration of the shutter being open $\Delta T3$. In the second strobe light mode 714B, an effective shutter speed 796B can be defined based on the second time period $\Delta T2$ with or without regard to the actual duration of the shutter being open $\Delta T3$. Further, an effective exposure in the first strobe light mode 714A can be affected at least by the first time period $\Delta T1$, the actual duration of the shutter being open $\Delta T3$, and the first light intensity 794A. An effective exposure in the second strobe light mode 714B can be affected at least by the second time periods $\Delta T2$, the actual duration of the shutter being open $\Delta T3$, and the second light intensity 794B.

In some embodiments, the duration of strobe light can be set to be shorter than the shutter time, as illustrated in FIG. 17. When the strobe light duration is shorter than the shutter window, it can effectively freeze the subject (such as a moving subject) at the moment of capturing the subject.

Also found in FIG. 17, the intensity of the strobe light can be adjusted by changing duration of a pulse signal that triggers the strobe light, relative to duration of the camera shutter being open. For example, if the duration of strobe light pulse signal is half of the time when the shutter is open, the intensity of the strobe light is half of the intensity of a strobe light whose duration matches the time when the shutter is open (assuming that the strengths of the strobe light pulse signals are the same).

Figure 18:
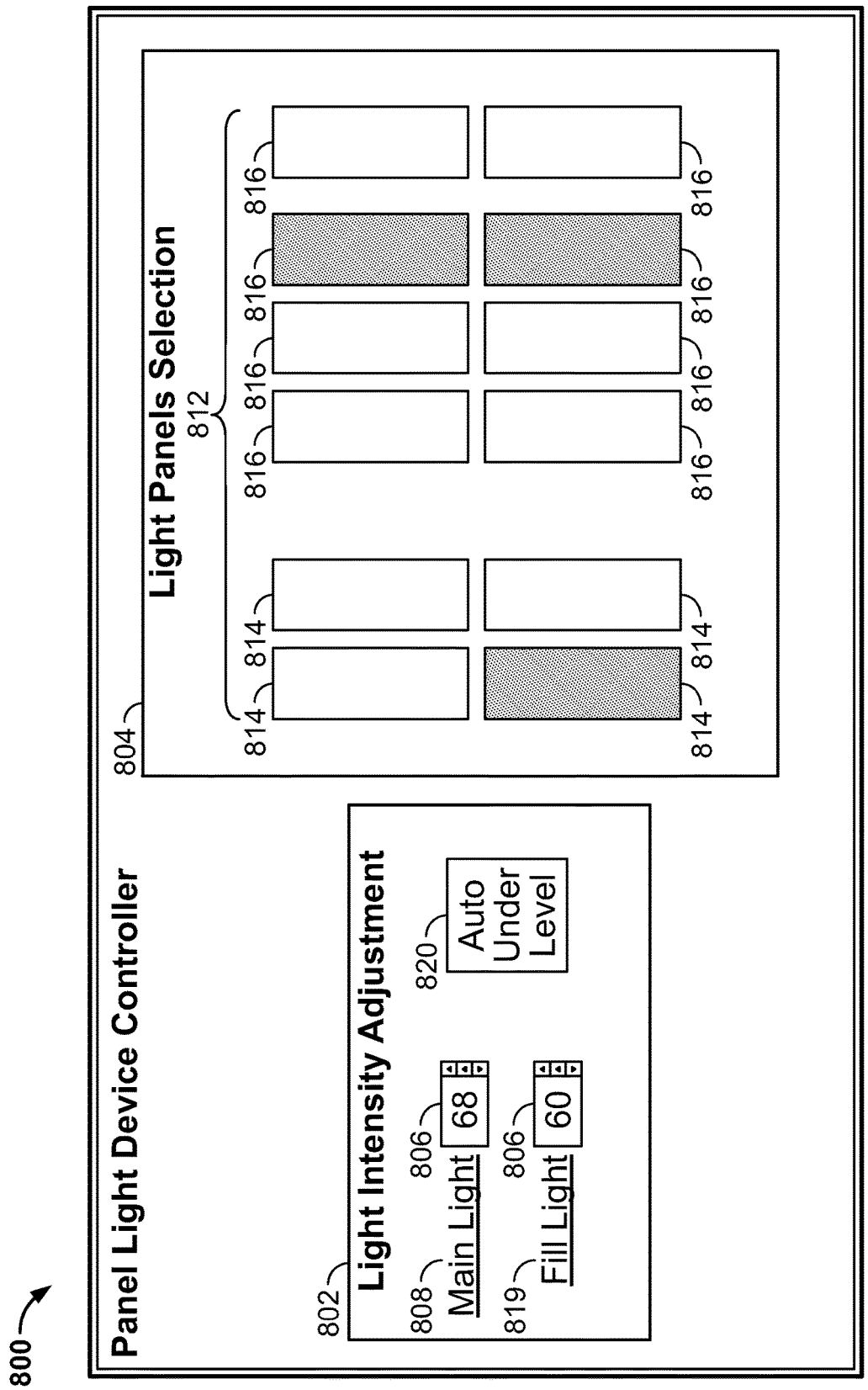
FIG. 18 schematically illustrates an example user interface for controlling the light panel device.

FIG. 18 schematically illustrates an example user interface 800 for controlling the panel light device 200. In some embodiments, the user interface 800 is provided to the controller 114 and/or the computing device 116. In other embodiments, the user interface 800 can be provided to the camera 112. The user interface 800 includes a light intensity adjustment section 802 and a light panel selection section 804.

The light intensity adjustment section 802 provides a control element 806 to adjust a light intensity (e.g., brightness) of one or more light panels 210 that are selected in the light panel selection section 804.

In some embodiments, the light intensity adjustment section 802 provides multiple control elements 806 for different types of lightings, such as a main light 808 and a fill light 810. In some embodiments, the plurality of light panels 210 can be grouped into different types of lightings, such as the main light 808 and the fill light 810 in this example. By way of example, in FIGS. 2 and 3, the four light panels 210 arranged on the first wall frame 134 can be predetermined as a main light while the eight light panels 210 arranged on the second wall frame 136 can function as a fill light. In this example, the control element 806 for the main light 808 is used to adjust light intensity of at least one of the four light panels 210 on the first wall frame 134, and the control element 806 for the fill light 810 is used to adjust light intensity of at least one of the eight light panels 210 on the second wall frame 136. Other configurations are also possible in other examples.

The light panel selection section 804 provides control elements 812 corresponding to the light panels 210 set up in the photography station 100 and enables an operator to select one or more of the light panels 210 through the control elements 812. In the illustrated example of FIGS. 2 and 3, the four light panels 210 arranged on the first wall frame 134 can be represented by a group of four control elements 814, and the eight light panels 210 arranged on the second wall frame 136 can be represented by a group of eight control elements 816.

In some embodiments, the control elements 812 are arranged and configured similarly to the light panels 210 actually set up in the photography station 100, and further operated to indicate whether the corresponding light panels 210 are turned on or off, and/or in which mode of operation the corresponding light panels 210 are operated.

In some embodiments, the user interface 800 further provides a control element 820 for performing an auto under level function. The auto under level function enables the camera to operate a predetermine number of f-stops underexposed. For example, the camera can operate two f-stops underexposed over ambient light.

Figure 19:
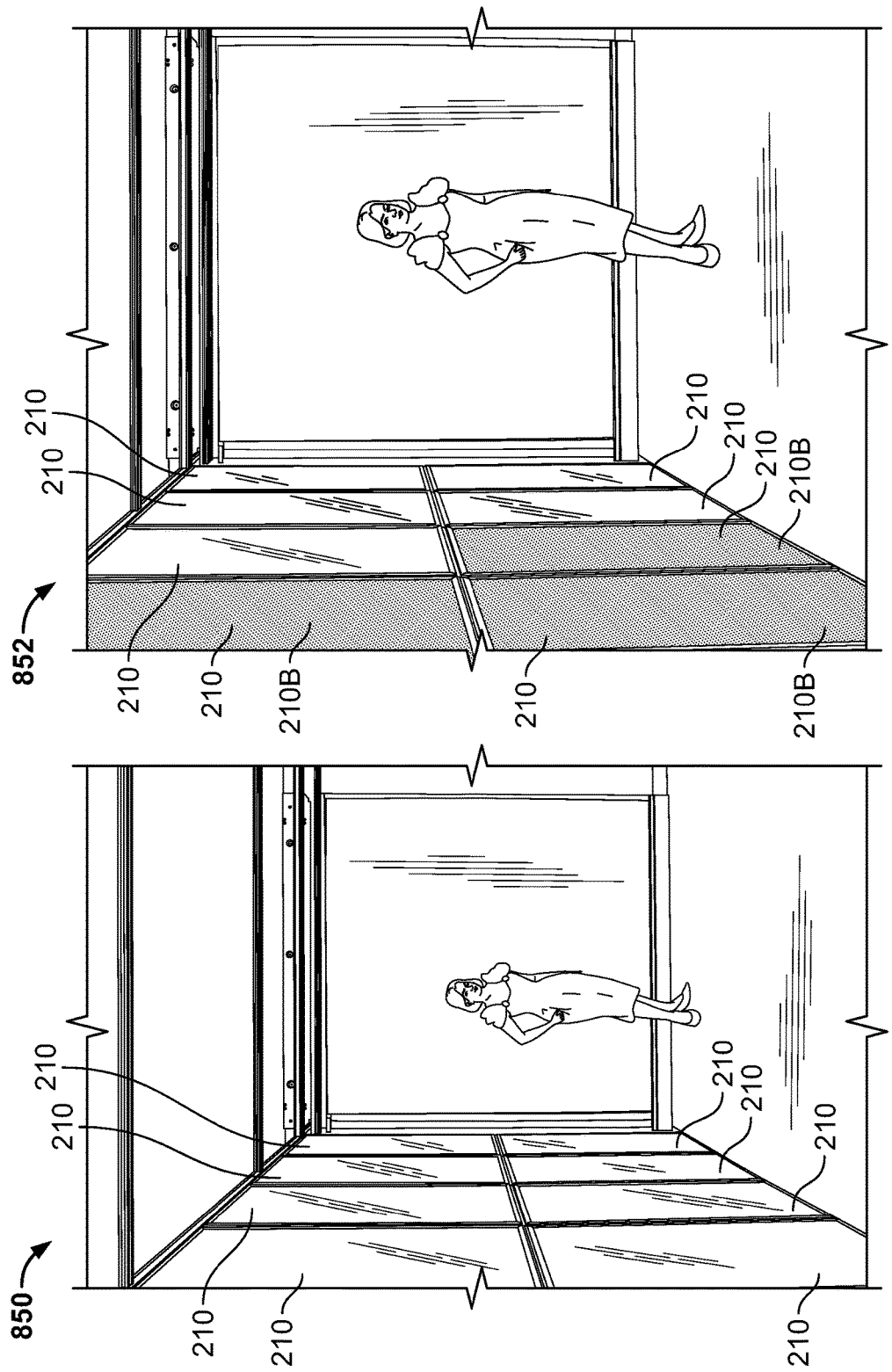
FIG. 19 illustrates example photographs captured in different operations of the panel light device.

FIG. 19 illustrates example photographs captured in different operations of the panel light device 200. For example, in the example setting of FIG. 1, a first photograph 850 is captured when all the light panels 210 are turned on and operate in the strobe light mode, and a second photograph 852 is captured when some light panels 210B are turned off while the other light panels 210 are turned on and operate in the strobe light mode. Such different operations of the light panels 210 can generate different lighting effect on the subject, such as different shades on the face of the subject, between the first photograph 850 and the second photograph 852.

As such, the present disclosure provides a panel light device including a plurality of light panels that are configured and operated in various arrangements and configurations. The panel light device can provide greater forgiveness of exposure than a point source of light, regardless of a location of the subject relative to the panel light device. The photography station allows arranging the subject in any location in the station and capturing quality photographs of the subject without changing the location of light panels. The photography system of the present disclosure provides a light assembly that can replace a typical main-fill strobe light system. The light assembly can generate a light that wraps around the subject and eliminates a harsh shadow on the background even when the subject is located near the background. Such a harsh shadow would otherwise be created by a typical light system.

In certain embodiments, the panel light device of the present disclosure can also be controlled for a multi-capture mode. In some embodiments, a plurality of light panels 210 can be independently and selectively operated to be in the strobe light mode at different points in time, and a sequence of photograph capturing can be performed over the duration of time. By way of example, the computing device or the controller stores and runs a series of image capture sessions and automatically synchronizes each session with a predetermined lighting option that is implemented by the light panels.

In certain embodiments, the panel light device of the present disclosure can be configured and operated to be used for background replacement.

The panel light device of the present application can create a lumen density (lumens per watt) that is similar to or better than typical xenon flashtubes. Thus, the panel light device can operate as point sources of light and generate strobe light effects as typical xenon flash light sources.

Although the panel light device is primarily described herein to be used with a stationary photography studio or station, it is also possible to use the panel light device with a portable photography station. In some examples, the light panels can be made flexible to make it more portable by rolling up, and thus make it easy to carry the components of the photography station and set them up in any location.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A photography system comprising:
   a camera arranged and configured to capture an image of a subject;
   a studio frame including one or more wall frames, and defining a subject arrangement area therein for arranging the subject during photography;
   a panel light device including:
      a plurality of light panels mounted to one of the one or more wall frames, each light panel being edge-lit including a plurality of light emitting diodes (LEDs) arranged along one or more edges of the light panel, and a light diffusing structure, and configured to generate diffused light toward the subject at the subject arrangement area; and
      at least one power control unit comprising:
         a continuous light power supply electrically connected to the plurality of light panels to generate continuous light of a first light intensity; and
         a strobe light power supply electrically connected to the plurality of light panels and configured to overdrive the plurality of LEDs to generate a flash of light of a second light intensity greater than the first light intensity; and
   a controller configured to synchronize operation of the panel light device and the camera.

2. The photography system of claim 1, wherein the controller is further configured to independently and selectively operate the plurality of light panels in a plurality of modes of operation.

3. The photography system of claim 2, wherein the plurality of modes of operation includes a continuous light mode and a strobe light mode.

4. The photography system of claim 3, wherein, in the continuous light mode, the controller controls the panel light device to generate the continuous light with the first light intensity.

5. The photography system of claim 3, wherein, in the strobe light mode, the controller controls the panel light device to generate the flash with the second light intensity.

6. The photography system of claim 3, wherein the controller is configured to control the panel light device to remain in the continuous light mode before the control device controls the panel light device to operate in the strobe light mode.

7. The photography system of claim 3, wherein the controller is configured to synchronize the strobe light mode with an operation of the camera.

8. The photography system of claim 1, wherein at least one of the plurality of light panels is independently operable from the other light panels.

9. The photography system of claim 1, wherein the studio frame has a first wall and a second wall, wherein the panel light device is mounted to at least one of the first wall and the second wall.

10. The photography system of claim 1, wherein each of the plurality of light panels include:
   one or more LED strips arranged along edges of the light panel; and
   a light guide plate configured to provide a uniform light illumination from the LED strips, wherein the LED strips are oriented to face inwards of the light panel.

11. A photography system for use in a photography station having a subject arrangement area therein and including a wall adjacent the subject arrangement area, the photography system comprising:
   a camera arranged and configured to capture an image of a subject in the subject arrangement area;
   a panel light device including:
      a plurality of light panels, each light panel being edge-lit including a plurality of LEDs arranged along one or more edges of the light panel, and a light diffusing structure; and
      a body frame adapted to mount the plurality of light panels to the wall;
   a plurality of power control units configured to control the plurality of light panels, each of the plurality of power control units comprising:
      a continuous light power supply electrically connected to the plurality of light panels to generate continuous light of a first light intensity; and
      a strobe light power supply electrically connected to the plurality of light panels and configured to overdrive the plurality of LEDs to generate a flash of light of a second light intensity greater than the first light intensity; and
   a controller configured to synchronize operation of the camera and the panel light device and to selectively operate at least one of the plurality of light panels in a continuous light mode through the plurality of power control units, the controller further configured to switch at least one of the plurality of light panels from the continuous light mode to a strobe light mode.

12. The photography station of claim 11, wherein the strobe light power supply includes an energy storage device configured to store electrical energy, the electrical energy being released to at least one of the plurality of light panels in the strobe light mode.

13. The photography station of claim 12, wherein the energy storage device includes one or more capacitors.

14. A panel light device for use in a photography station having a subject arrangement area therein and including a wall adjacent the subject arrangement area, wherein the photography station includes a camera operable to capture an image of a subject in the subject arrangement area, wherein the panel light device comprises:
   a plurality of edge-lit light panels, each light panel including a plurality of LEDs arranged along one or more edges of the light panel, a light diffusing structure, and a body frame, the body frame configured to mount the plurality of edge-lit light panels to the wall of the photography station;
   a plurality of power control units configured to supply electrical power to the plurality of edge-lit light panels, each of the plurality of power control units comprising:
      a continuous light power supply electrically connected to the plurality of edge-lit light panels to generate continuous light of a first light intensity; and
      a strobe light power supply electrically connected to the plurality of edge-lit light panels and configured to overdrive the plurality of LEDs to generate a flash of light of a second light intensity greater than the first light intensity; and
   a controller configured to synchronize operation of the camera with operation of the plurality of edge-lit light panels, including to selectively operate at least one of the plurality of edge-lit light panels in a continuous light mode using at least one of the plurality of power control units, and to selectively operate the at least one of the plurality of edge-lit light panels in a strobe light mode using the at least one of the plurality of power control units.

* * * * *